(12) United States Patent
Momona

(10) Patent No.: US 7,203,492 B2
(45) Date of Patent: Apr. 10, 2007

(54) MOBILE COMMUNICATION METHOD AND SYSTEM

(75) Inventor: Morihisa Momona, Tokyo (JP)

(73) Assignee: NEC Corporation (JP)

( * ) Notice: Subject to any disclaimer, the term of this patent is extended or adjusted under 35 U.S.C. 154(b) by 637 days.

(21) Appl. No.: 10/309,264

(22) Filed: Dec. 4, 2002

(65) Prior Publication Data

US 2003/0104807 A1 Jun. 5, 2003

(30) Foreign Application Priority Data

Dec. 5, 2001 (JP) ............................. 2001-371057

(51) Int. Cl.
*H04Q 7/20* (2006.01)
(52) U.S. Cl. .............................. 455/432.1; 455/435.1; 455/433; 370/310.2; 370/353; 370/395.31
(58) Field of Classification Search ............ 455/432.1, 455/433, 435.1; 370/310.2, 352, 353, 395.31
See application file for complete search history.

(56) References Cited

U.S. PATENT DOCUMENTS

| | | | |
|---|---|---|---|
| 6,765,892 B1 * | 7/2004 | Leung et al. ............... | 370/332 |
| 6,988,146 B1 * | 1/2006 | Magret et al. ............. | 709/238 |
| 2002/0039367 A1 * | 4/2002 | Seppala et al. ............ | 370/401 |
| 2002/0080767 A1 * | 6/2002 | Lee ........................... | 370/349 |
| 2005/0250491 A1 * | 11/2005 | Roy ........................... | 455/428 |

FOREIGN PATENT DOCUMENTS

| JP | 9-326791 | 12/1997 |
|---|---|---|
| JP | 2001-77859 | 3/2001 |
| JP | 1001-177564 | 6/2001 |
| JP | 2002-217952 | 8/2002 |
| JP | 2002-538690 | 11/2002 |

OTHER PUBLICATIONS

Changdong Liu, et al., "Mobility Support For The Core-Manager Based Scalabel Multicast Routing," Cuny Graduate School, Department of Electrical Engineering, 1998 IEEE, pp. 1-13.
IETF Mobile IP Working Group, Hierarchical MIPv6 mobility management, <draft-ietf-mobileip-hmipv6-02.txt,> http://www3/ietf.org/proceedings/01mar/I-d/mobileip-hmipv6.02.txt, pp. 1-24.
C. Perkins, Editor, Network Working Group, Request for comments: 2002, IP Mobility Support, Oct. 1996, http://www.ietf.org/rfc/rfc2002.txt, pp. 1-70.

* cited by examiner

*Primary Examiner*—Temica Beamer
(74) *Attorney, Agent, or Firm*—Dickstein, Shapiro, LLP.

(57) ABSTRACT

In a communications network, a home domain of the network formulates a multicast packet destined to a first multicast address locally unique in the home domain, encapsulates the packet in a packet destined to a second multicast address other than an individual care-of address, and transmits the packet. A mobile node visiting a foreign domain receives a packet containing the second multicast address. In a foreign-to-home multicast transmission, the visiting mobile node formulates a multicast packet destined to the first multicast address, encapsulates the packet in a packet destined to the second multicast address and transmits the packet. In the home domain, a packet containing the second multicast address is received and decapsulated to extract a packet destined to the first multicast address. The second multicast address is either a globally unique multicast address or a foreign local multicast address which is locally unique in the foreign domain.

12 Claims, 23 Drawing Sheets

MOBILE NODE

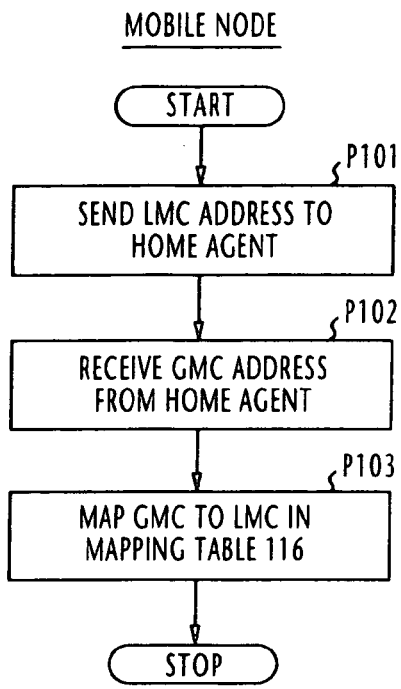
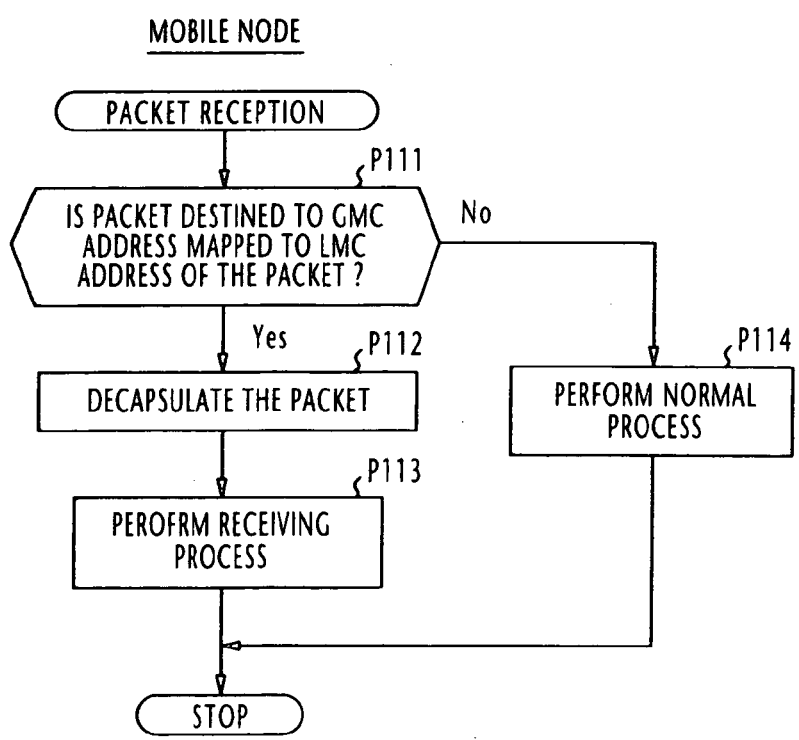

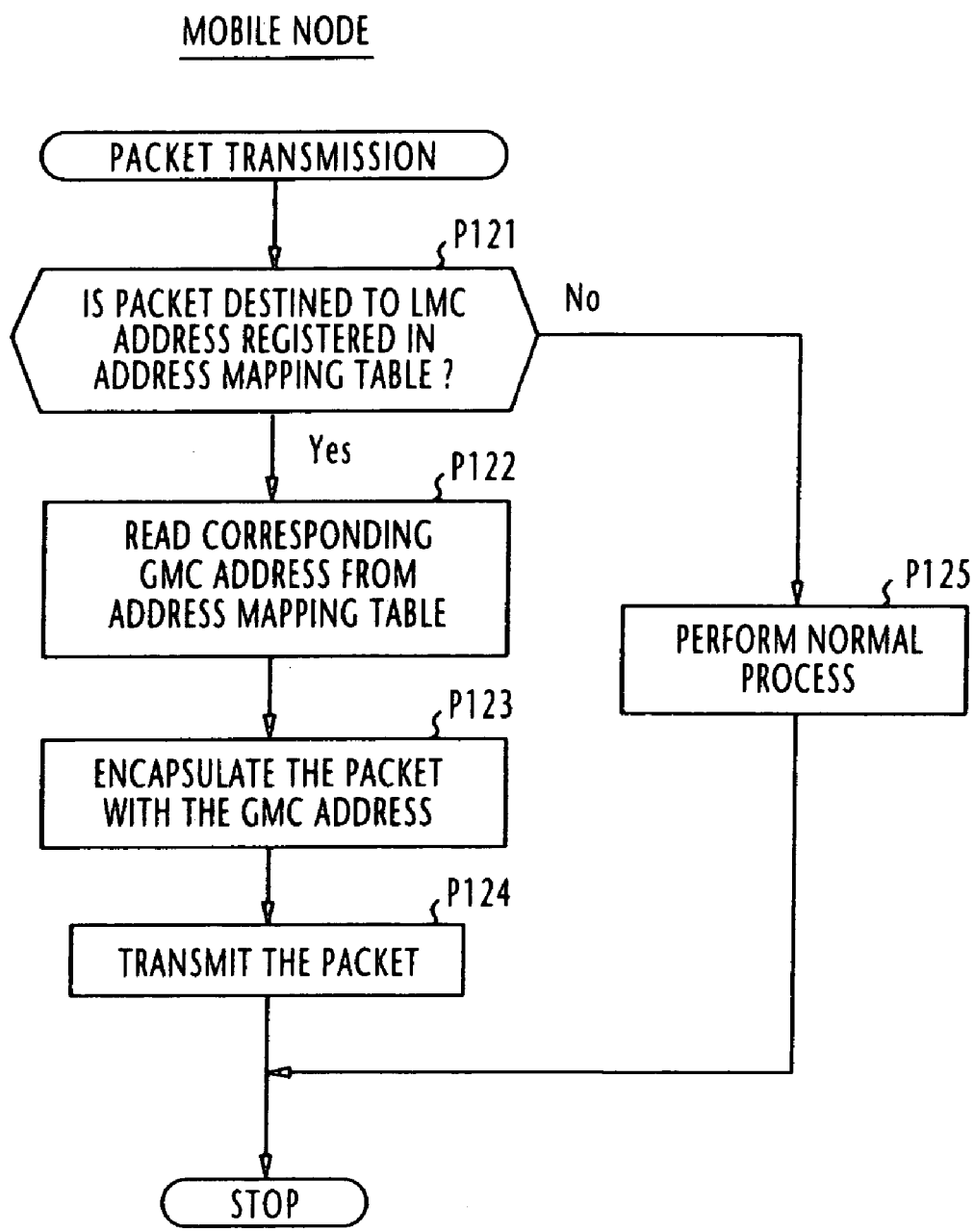

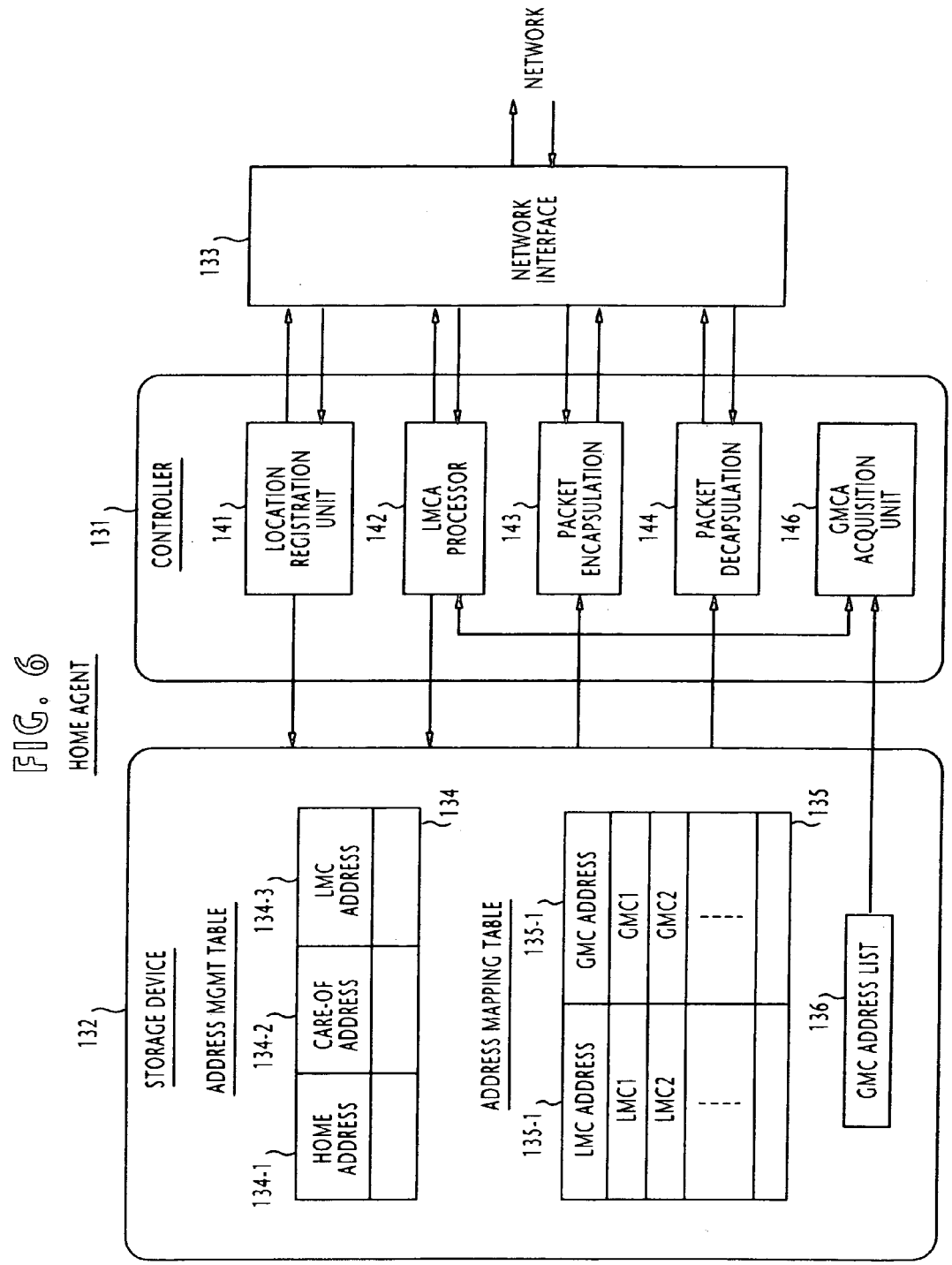

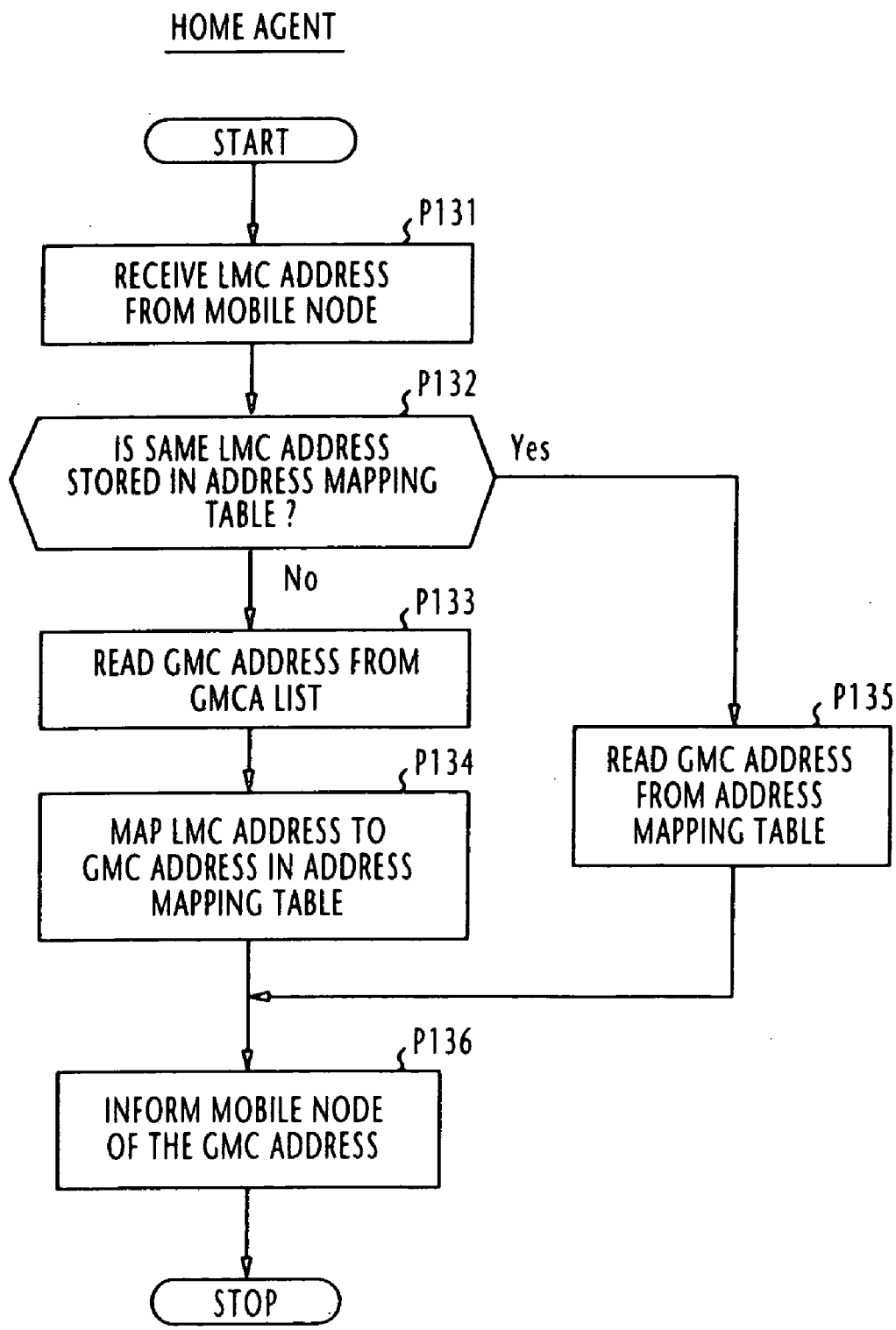

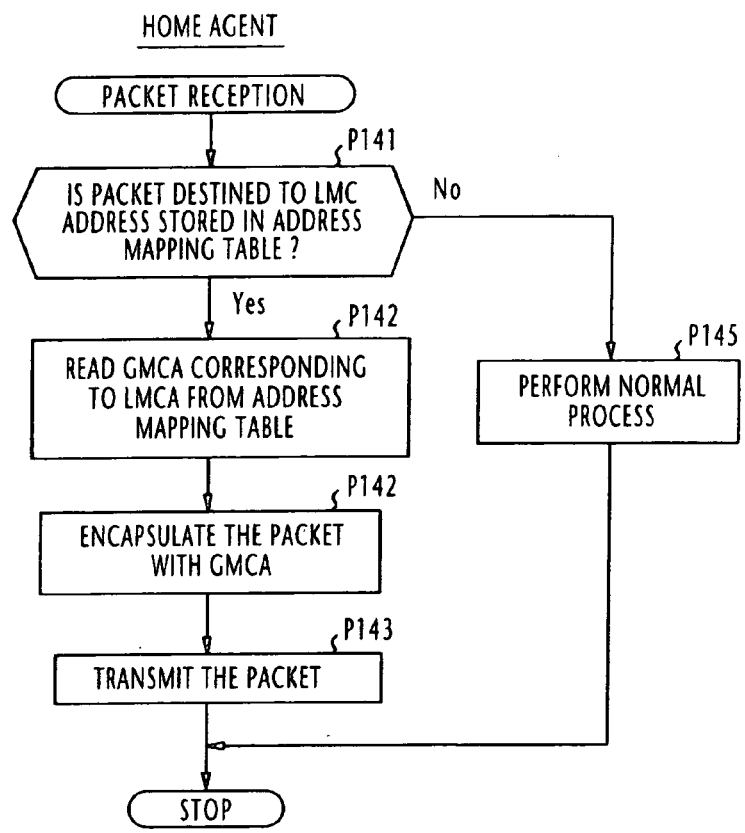
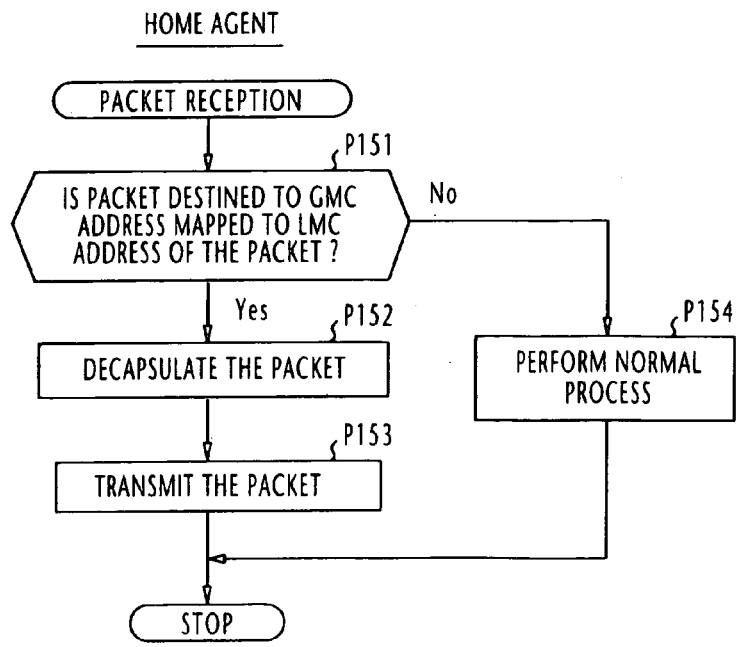

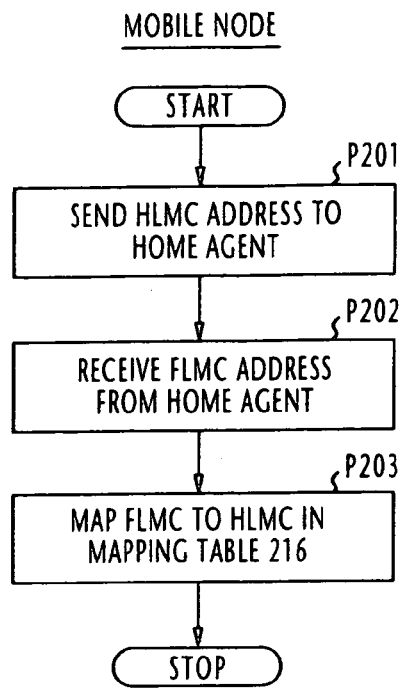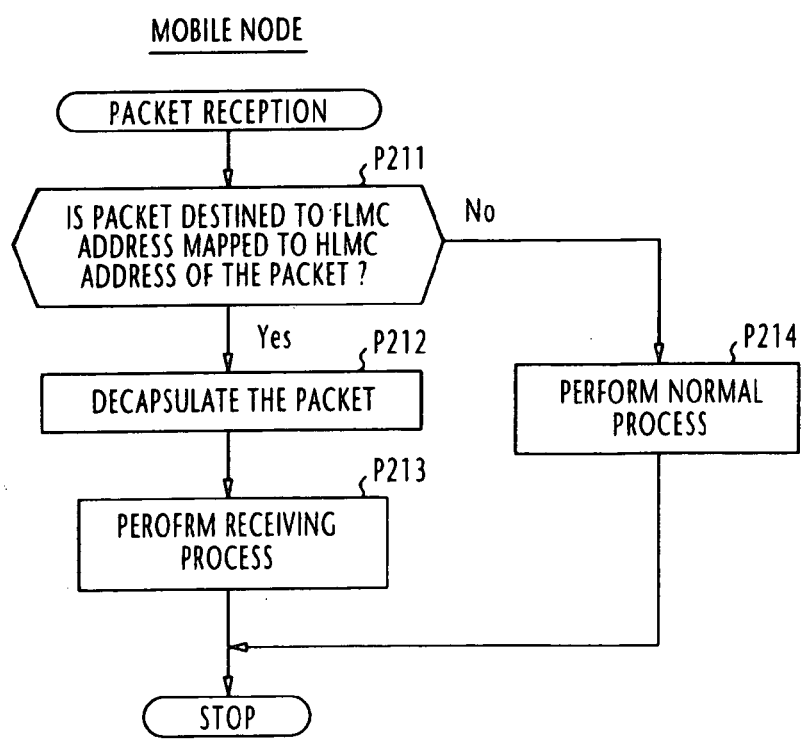

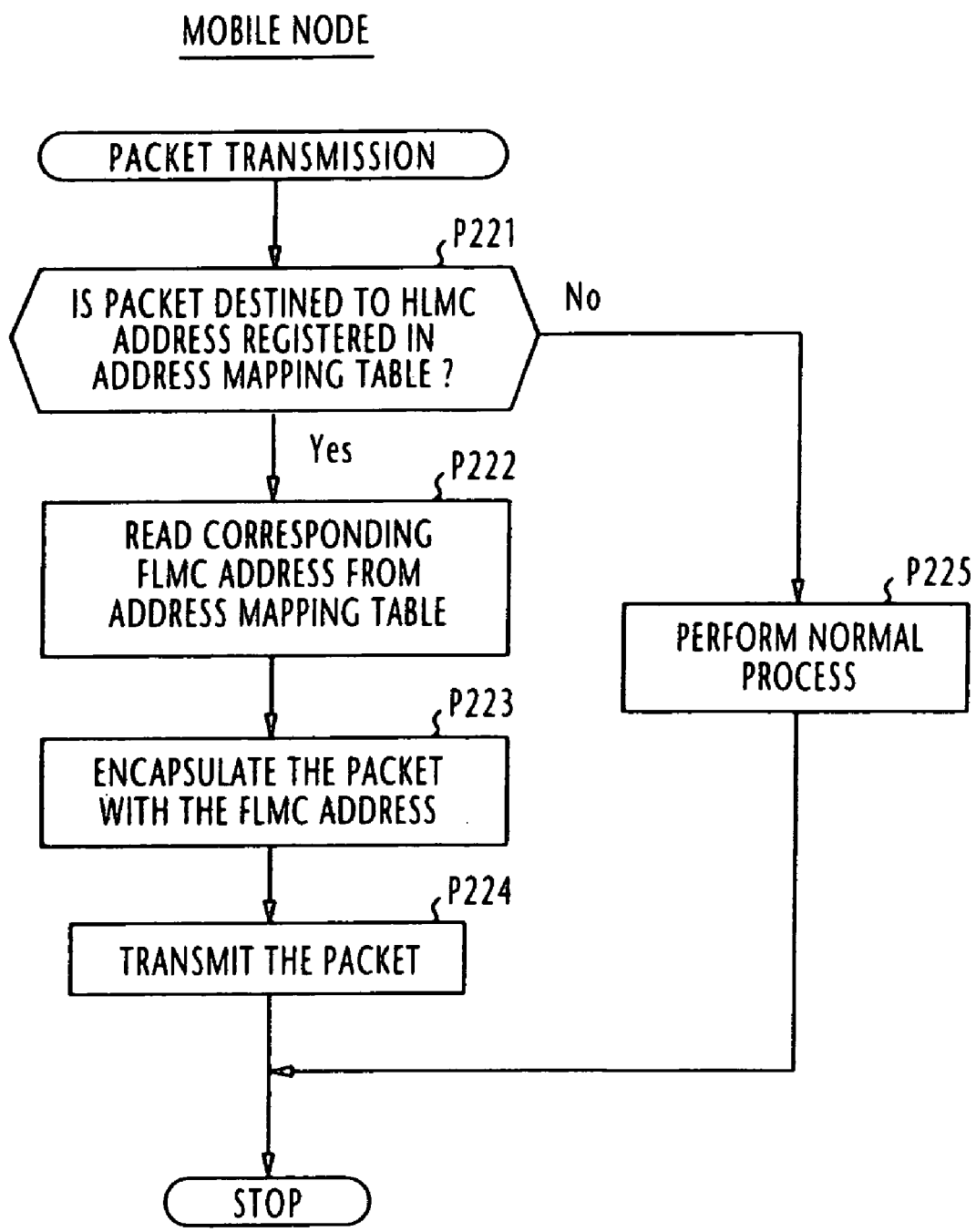

MOBILE NODE

HOME AGENT

MOBILITY AGENT

MOBILITY AGENT

MOBILITY AGENT

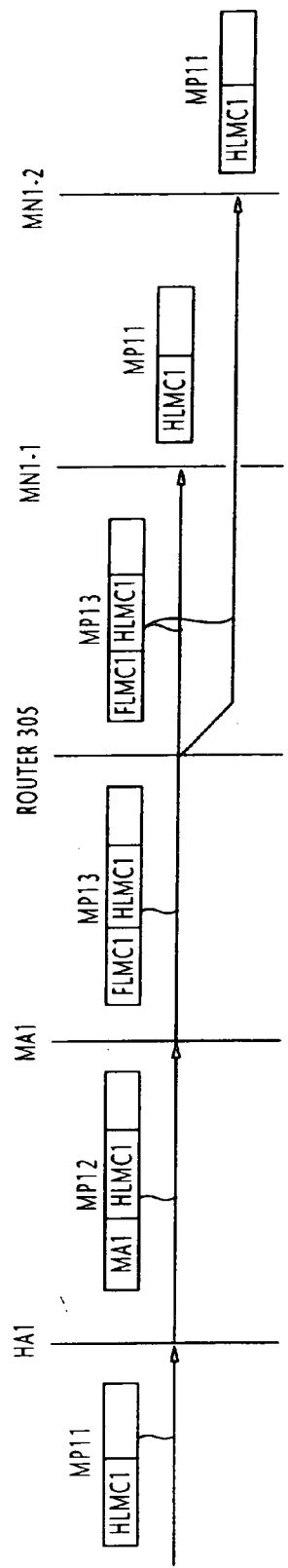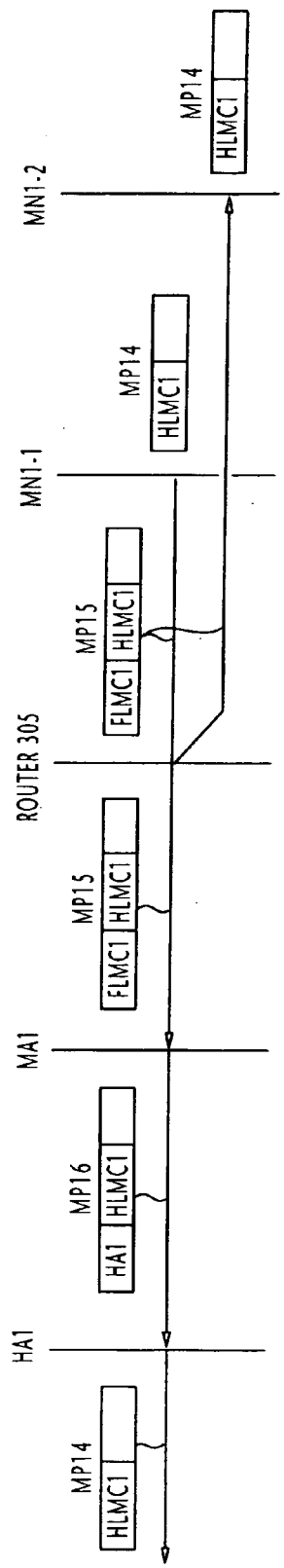

MOBILE COMMUNICATION METHOD AND SYSTEM

BACKGROUND OF THE INVENTION

1. Field of the Invention

The present invention relates generally to mobile communication systems, and more specifically to a technique for multicast sessions between home domain and visiting mobile nodes.

2. Description of the Related Art

Mobile IP protocol developed by the Internet Engineering Task Force guarantees reachability for unicast packets, (http://www.ietf.org/rfc/rfc 2002.txt.). According the mobile IP protocol, a mobile node belongs to a link (or home link of the mobile node) of a management domain (or home domain of the mobile node) and on this home link the mobile node is assigned an address. A mobility management agent is set up on the home link as a home agent of the mobile node. In order to guarantee reachability of unicast packets for a mobile node visiting another link of the home domain or a link of a foreign management domain, the mobile node acquires a temporary address, known as a care-of address, from the visited link and communicates this care-of address to the home agent. If the home agent receives a packet destined for the mobile node, it formulates a packet with the care-of address and encapsulates the received packet in the formulated packet and transmits it to the mobile node, now visiting the foreign domain.

Hierarchical mobility management protocol is known. This protocol can be used in combination with the mobile IP protocol. See "Hierarchical MIPv6 mobility management", (http://www.ietf.org/internet-drafts/draft-ie-tf-mobileip-hmipv6-03). According to the hierarchical mobility management scheme, mobility management agents (or mobility agents) are provided in a foreign domain. A mobile node, when visiting the foreign domain, notifies its home agent of the address of a mobility agent as a care-of address of the mobile node and notifies the mobility agent of its own home address and a care-of address obtained from a link to which the mobile node is currently attached. The home agent, on receiving a packet destined to the mobile node, formulates a packet destined to the mobile-notified care-of address (i.e., the address of the mobility agent). The received packet is encapsulated in the formulated packet and transmitted. In response to this packet, the mobility agent decapsulates it to extract the inner packet, examines its destination address, formulates a packet destined to a care-of address corresponding to the home address that matches the destination address and encapsulates the extracted packet in the formulated packet for transmission.

Mobile nodes, when visiting a foreign domain, are able to participate in a multicast session with their home mobile nodes by using a multicast (MC) address which is locally unique to the home domain. In this multicast session, the mobile IP protocol requires that visiting mobile nodes notify the home domain of their care-of addresses assigned to them from the visiting domains. In the home domain, a multicast packet is encapsulated in packets respectively destined to the care-of addresses and individually tunneled to the visiting domains. Each visiting mobile node decapsulates the packet to extract the inner multicast packet.

As a result, in the prior art techniques, the network bandwidth resource is consumed in proportion to the number of mobile nodes visiting foreign domains. Furthermore, with the prior art hierarchical mobility management scheme, an increased burden is placed on mobility management nodes (such as home agents and mobility agents) since the mobility agent of a foreign domain must perform as many encapsulation processes as there are mobile nodes visiting the foreign domain.

SUMMARY OF THE INVENTION

It is therefore an object of the present invention to provide a mobile communication system in which overhead burden for performing multicast sessions between the home domain and visiting mobile nodes is significantly reduced.

According to a first aspect of the present invention, there is provided a method of establishing a multicast session in a communication network between a home domain of the network and a mobile node visiting a foreign domain of the network. The method comprises the steps of formulating, in the home domain, a multicast packet destined to a first multicast address locally unique in the home domain, encapsulating the multicast packet in a packet destined to a second multicast address other than an individual care-of address, transmitting the packet, and receiving at the visiting mobile node a packet containing the second multicast address. For transmission to the home domain, the visiting mobile node formulates a multicast packet destined to the first multicast address, encapsulates the multicast packet in a packet destined to the second multicast address and transmits the packet. In the home domain, a packet containing the second multicast address is received and decapsulated to extract a packet destined to the first multicast address. The second multicast address is a global multicast address which is globally unique in the communication network or a foreign local multicast address which is locally unique in the foreign domain.

According to a second aspect, the present invention provides a method of establishing a multicast session in a communication network between a home domain of the network and a mobile node visiting a foreign domain of the network. The method comprises the steps of formulating a multicast packet destined to a home local multicast address locally unique in the home domain, encapsulating the multicast packet in a packet destined to the address of a mobility agent in the foreign domain and transmitting the packet, receiving at the mobility agent a packet containing the address of the mobility agent, replacing the address of the mobility agent with a foreign local multicast address locally unique in the foreign domain, and transmitting the packet, and receiving at the visiting mobile node a packet containing the foreign local multicast address. For transmission to the home domain, the visiting mobile node formulates a multicast packet destined to the home local multicast address, encapsulates the multicast packet in a packet destined to the foreign local multicast address and transmits the packet, and receiving at said mobility agent a packet containing the foreign local multicast address, replaces the foreign local multicast address with the address of a home agent of the home domain and transmits the packet. The home agent receives a packet containing the address of the home agent, decapsulates the received packet to extract a packet destined to said home local multicast address, and transmits the packet to the home domain.

According to a third aspect, the present invention provides a method of establishing a multicast session in a communication network between a home domain of the network and a mobile node visiting a foreign domain of the network, comprising the steps of formulating in the home domain a multicast packet destined to a local multicast address locally unique in the home domain and transmitting the packet, receiving at a home agent of the home domain the multicast packet and encapsulating it in a packet destined to a global multicast address, and transmitting the packet. At the visiting mobile node, a packet containing the global multicast address is received. For transmission to the home domain, the visiting mobile node formulates a multicast packet destined to the local multicast address, encapsulates the multicast packet in a packet destined to the global multicast address and transmits the packet. The home agent receives a packet containing the global multicast address and decapsulates the packet to extract a packet destined to the home multicast address, and transmitting the packet to said home domain.

According to a fourth aspect, the present invention provides a method of establishing a multicast session in a communication network between a home domain of the network and a mobile node visiting a foreign domain of the network which is adjacent to the home domain and which includes a multicast address management node for maintaining a plurality of foreign local multicast addresses locally unique in the foreign domain, comprising the steps of formulating in the home domain a multicast packet destined to a home local multicast address which is locally unique in the home domain, and transmitting the packet. At the home agent, a packet containing the home local multicast address is received and encapsulated in a packet destined to a foreign local multicast address which is obtained from the multicast address management node, and transmitted. At the visiting mobile node, a packet containing the foreign local multicast address is received and processed. For transmission to the home domain, the visiting mobile node formulates a multicast packet destined to the first multicast address, encapsulates the multicast packet in a packet destined to the foreign local multicast address and transmits the packet. At the home agent, a packet containing the foreign local multicast address is received and decapsulated to extract a packet destined to the home local multicast address, and the packet is transmitted to the home domain.

According to a fifth aspect of the present invention, there is provided a method of establishing a multicast session in a communication network between a home domain of the network and a mobile node visiting a foreign domain of the network, the home domain including a home agent and the foreign domain including a multicast address management node for address management of a plurality of foreign local multicast addresses locally unique in the foreign domain and a mobility agent for mobility management of the visiting mobile node. According to this method, the home domain formulates a multicast packet destined to a home local multicast address locally unique in the home domain, and transmits the packet. The home agent receives a packet containing the home local multicast address and encapsulates the packet in a packet destined to the address of the mobility agent and transmitting the packet. At the mobility agent, a packet containing the address of the mobility agent is received and the address of the mobility agent is replaced with a foreign local multicast address which is obtained from the multicast address management node, and the packet is transmitted. At the visiting mobile node, a packet containing the foreign local multicast address is received and processed. For transmission to the home domain, the visiting mobile node formulates a multicast packet destined to the home local multicast address, encapsulates the multicast packet in a packet destined to the foreign local multicast address, and transmits the packet. The mobility agent receives a packet containing the foreign local multicast address and replaces the foreign local multicast address with the address of the home agent, and transmits the packet. The home agent receives a packet containing the address of the home agent, decapsulates the packet to extract a packet destined to the home local address, and transmits the packet to the home domain.

BRIEF DESCRIPTION OF THE DRAWINGS

The present invention will be described in detail further with reference to the following drawings, in which:

FIG. 3 is a flowchart of the operation of the mobile node of FIG. 1 which, when visiting a foreign domain, notifies the home agent of its local multicast address in order to acquire a global multicast address;

FIG. 4 is a flowchart of the operation of the visiting mobile node of FIG. 1 when receiving a multicast packet from the home domain;

FIG. 5 is a flowchart of the operation of the visiting mobile node of FIG. 1 when transmitting a multicast packet to the home domain;

FIG. 6 is a block diagram of a home agent of the network of FIG. 1;

FIG. 7 is a flowchart of the operation of the home agent of FIG. 1 when it responds to the notification of a local multicast address from a visiting mobile node for assigning a global multicast address;

FIG. 8 is a flowchart of the encapsulation process of the home agent of FIG. 1 when receiving a multicast packet from a home domain;

FIG. 9 is a flowchart of the decapsulation process of the home agent of FIG. 1 when receiving a multicast packet from a visiting mobile;

FIG. 15 is a flowchart of the operation of the mobile node of FIG. 13 which, when visiting a foreign domain, notifies the home agent of its home local multicast (HLMC) address in order to acquire a foreign local multicast (FLMC) address of the foreign domain;

FIG. 16 is a flowchart of the operation of the visiting mobile node of FIG. 13 when receiving a multicast packet from the home domain;

FIG. 17 is a flowchart of the operation of the visiting mobile node of FIG. 13 when transmitting a multicast packet to the home domain;

FIG. 31 is a sequence diagram illustrating a flow of a multicast packet transmitted from home domain to mobile nodes visiting a foreign domain according to the third embodiment of the invention; and FIG. 32 is a sequence diagram illustrating a flow of a multicast packet transmitted from a visiting mobile node to home domain according to the third embodiment of the invention.

DETAILED DESCRIPTION

Figure 1:
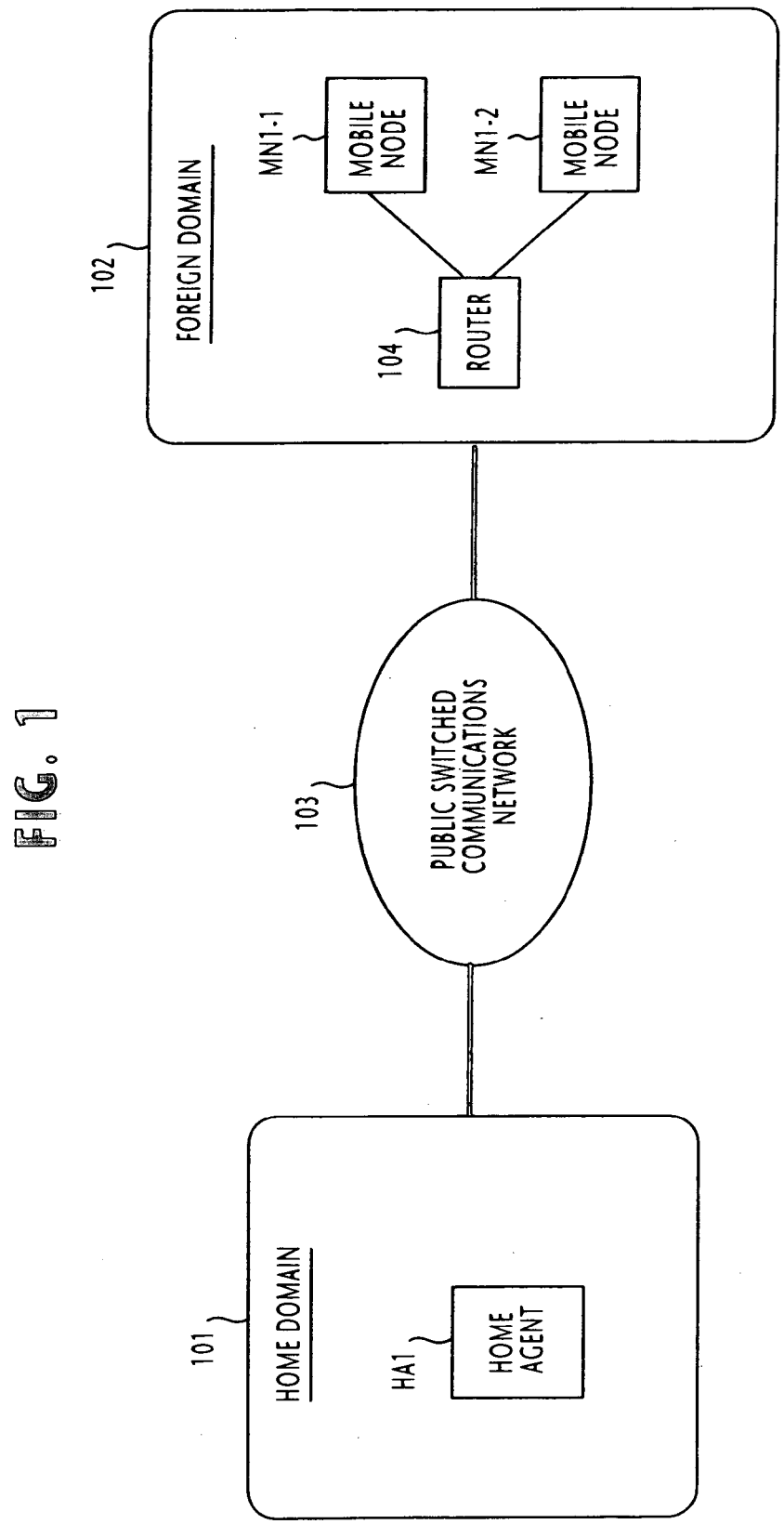
FIG. 1 is a block diagram of a mobile communication network configured according to a first embodiment of the present invention.

Referring now to FIG. 1, there is shown a mobile communication system according to a first embodiment of the present invention. The communication system of FIG. 1 comprises a plurality of network domains 101 and 102 interconnected via a public switched communications network 103. Two mobile nodes MN1-1 and MN1-2 are illustrated. Domain 101 is their home domain and the domain 102 is a foreign domain which is currently visited by the mobile nodes. A home agent HA1 is provided in the home domain 101. Visiting mobile nodes MN1-1 and MN1-2 are participating in a multicast session with home mobile nodes using a local multicast address LMC1 of the home domain 101.

Figure 2:
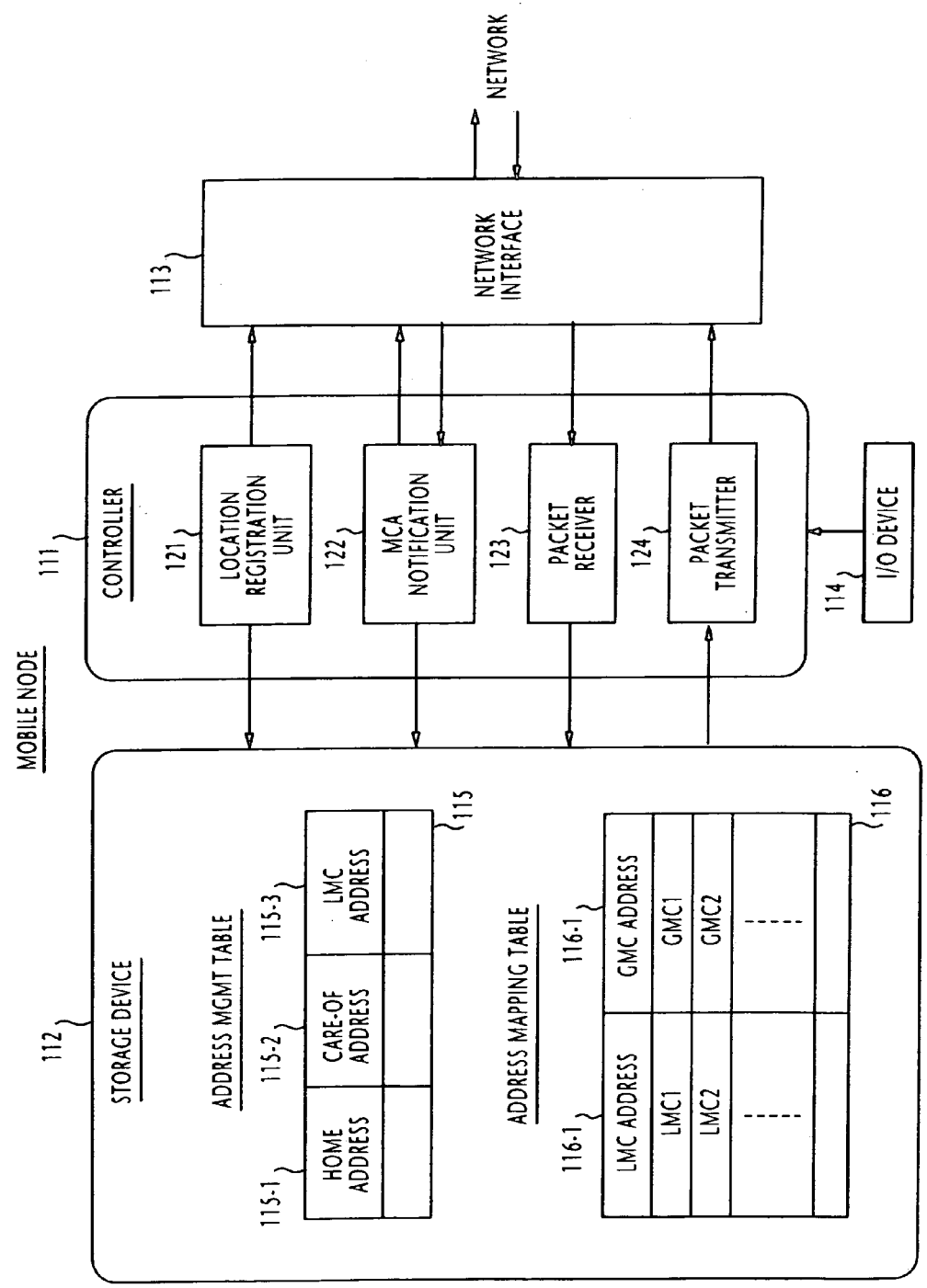
FIG. 2 is a block diagram of a mobile node of the network of FIG. 1.

As shown in FIG. 2, each of the mobile nodes is comprised of a controller 111, a storage device 112, a network interface 113, and an input/output device 114. An address management table 115 and an address mapping table 116 are created in the storage device. Address management table 115 is partitioned into a plurality of fields 115-1, 115-2 and 115-3. The home address of the mobile node is set in the field 115-1 and a care-of address is set in the field 115-2. A local multicast address (LMCA) of the home domain 101, which is entered through the I/O device by the mobile user, is set in the LMCA field 115-3. The care-of address is a temporary address that is assigned to and currently used by the mobile node when it makes a visit to a foreign domain and registers its location with the home agent HA1. The address stored in the LCMA field 115-3 is assigned to a particular multicast session and locally unique to the home domain. Address mapping table 116 includes a local multicast address (LMCA) field 116-1 and a global multicast address (GMCA) field 116-2. For each particular multicast session, a local multicast address (LMC) and a global multicast address (GMC) are assigned and their one-to-one corresponding relationship is maintained in the address mapping table. The local multicast address is one that is locally unique in a management domain (home and foreign domains) and the global address is one that is globally unique in the mobile communication system as a whole.

Controller 111 provides overall control of the mobile node and includes a location registration unit 121, a multicast address request unit 122, a packet receiver 123 and a packet transmitter 124. Communication between the controller 111 and the public switched network 103 proceeds through the network interface 113 using a wireless or wired link. The input/output device 114 is a user interface such as a keyboard or visual display unit.

The mobile node is usually attached to the home domain 101. When the point of attachment of the node changes from one domain to another, the location registration unit 121 of the mobile node registers its current location with the home agent HA1 and stores a care-of address assigned by the visited domain into the care-of address field 115-2 of its address management table. This care-of address will be used when encapsulating a unicast packet. Multicast address request unit 122 operates when the mobile node enters a foreign domain. If the mobile node user desires to join a home domain multicast session, the multicast address request unit 122 reads a desired local multicast address of its home domain from the LMCA field 115-3 and communicates it to the home agent HA1 (step P101, FIG. 3). Home agent HA1 responds to this notification with a reply which contains a global multicast address. Multicast address request unit 122 receives (step P102) and associates the global multicast address with the local multicast address in the mapping table 116 (step P103).

During the reception mode of a multicast session using a local multicast address of the home domain, the mobile node receives a multicast packet from the home domain. Packet receiver 123 examines the destination address of the packet and determines if it corresponds to a global multicast address (GMCA) registered in the address mapping table 116 (step P111, FIG. 4). If it corresponds to one of the mapped global multicast addresses, the packet receiver 123 decapsulates the multicast packet to extract its inner packet (step P112). The extracted packet, which contains a multicast address that is only unique to the home domain, is delivered to the input/output device 114 (step P113). If the decision at step P111 is negative, the received packet is processed in a conventional manner (step P114).

During the transmission mode of the multicast session, the packet transmitter 124 of the visiting mobile node determines whether the destination of a packet to be transmitted corresponds to a local multicast address (LMCA) registered in the address mapping table 116 (step P121, FIG.

5). If the decision is affirmative, a global multicast address associated with that local multicast address is retrieved from the address mapping table 116 (step P122). The packet is encapsulated in a packet with the retrieved global multicast address as its destination (step P123) and transmitted to the network (step P124). If the packet to be transmitted does not correspond to any of the local multicast addresses of the address mapping table 116, flow proceeds from step P121 to step P125 to process the packet in a conventional manner.

FIG. 6 shows details of the home agent HA1. The home agent is comprised of a controller 131, a storage device 132, and a network interface 133. A mobile node (MN) management table 134 and an address mapping table 135 are created in the storage device 132. The MN management table 134 is partitioned into a plurality of rows (entries) which correspond respectively to different mobile nodes visiting a foreign domain. Each entry of the MN management table 134 is subdivided into columns (fields) 134-1, 134-2 and 134-3. In each entry, the home address of the associated mobile node is set in the field 134-1 and a care-of address of the mobile node is set in the C/O field 134-2. A local multicast address (LMC) of the home domain of the mobile node is set in the LMCA field 134-3 of the associated entry of the table. Furthermore, a GMCA list 136 is created in the storage device 132 for storing a plurality of global multicast addresses which will be used in combination with a plurality of local multicast addresses of the home domain.

Address mapping table 135 includes a local multicast address (LMCA) field 135-1 and a global multicast address (GMCA) field 135-2 for mapping local multicast addresses (LMC) and corresponding global multicast addresses (GMC) to establish their relationships for different multicast sessions. Controller 131 provides overall control of the home agent HA1 and includes a location registration unit 141, an LMCA processor 142, a packet encapsulation unit 143, a packet decapsulation unit 144, and a GMCA acquisition unit 145. Communication between the controller 131 and the public switched network 133 proceeds through the network interface 133 using a wireless or wired link.

When a mobile node changes its point of attachment from one domain to another, the HA location registration unit 141 receives a registration request from the mobile node, stores the home address of the mobile node in the home address field 134-1 and assigns a care-of address and stores it in the care-of address field 134-2 of the entry of the requesting mobile node.

Following the location registration process of a mobile node, a multicast address registration process is performed by the home agent. In this address registration process, the LMCA processor 142 receives an LMCA notification message from the mobile node and performs a multicast address registration. As shown in FIG. 7, when the home agent HA1 receives a local multicast address from a mobile node (step P131), the LMCA processor 142 searches the address mapping table 135 for a corresponding LMCA (step P132). If there is no corresponding local multicast address, the LMCA processor 142 enables the GMCA acquisition unit 146 to retrieve a global multicast address from the GMCA list 136 (step P133). The retrieved GMCA is then mapped to the mobile-transmitted LMCA in the address mapping table 135 (step P134). If the mobile-transmitted LMCA has a corresponding GMCA in the address mapping table 135, this global multicast address is retrieved from this table (step P135). The global multicast address obtained by step P134 or P135 is transmitted in a reply message from the home agent to the requesting mobile node (step P136).

It is seen that, if the home agent HA1 finds no global multicast address corresponding to the local multicast address contained in a notification message from mobile node MN1-1, it retrieves a global multicast address from the GMCA list 136 and registers this address in the address mapping table 135 and sends a reply message containing the retrieved global multicast address to the mobile node MN1-1. If the home agent HA1 receives a second LMCA notification message from the mobile node MN1-2 for the same multicast session, it will determine that the local multicast address contained in the second notification message has a corresponding global multicast address which has already been assigned to the mobile node MN1-1. Thus, the home agent retrieves the same global multicast address from the address mapping table 135 and communicates this address in a reply message to the mobile node MN1-2.

During a multicast session, the packet encapsulation unit 143 of the home agent controls the flow of packets from the home domain to mobile nodes visiting a foreign domain, as shown in the flowchart of FIG. 8, and the packet decapsulation unit 144 controls the flow of packets from the visiting mobile nodes to the home domain as shown in the flowchart of FIG. 9.

In FIG. 8, when the packet encapsulation unit 143 receives a multicast or unicast packet transmitted from a mobile node attached to the home domain, it reads the destination address from the packet and searches the address mapping table 135 for a corresponding local multicast address (step P141). If the decision is affirmative, a global multicast address which corresponds to that local multicast address is retrieved from the address mapping table 135 (step P142). The received packet is encapsulated in a packet destined to the retrieved global multicast address (step P143) and transmitted (step P144). If it is determined that the received packet has no corresponding local multicast address, a conventional process is performed on the packet (step P145).

In FIG. 9, when the packet decapsulation unit 144 of the home agent receives a multicast packet transmitted from a mobile node currently attached to a foreign domain, it reads a global multicast address from the destination field of the encapsulation header of the packet and searches the address mapping table 135 for coincidence (step P151). If the decision is affirmative at step P151, the received packet is decapsulated (step P152) by removing its encapsulation header. The original packet is thus extracted and transmitted to the mobile nodes of the home domain (step P153). If a received packet has no corresponding global multicast address in the address mapping table of the home agent, a conventional process proceeds (step P154).

Figure 10:
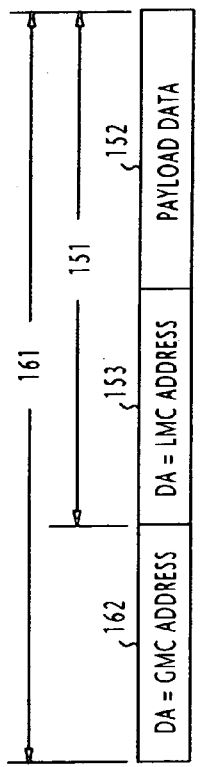
FIG. 10 is an illustration of the data format of a multicast packet according to the first embodiment of the present invention.

As shown in FIG. 10, the encapsulation process is either performed at the mobile nodes or at the home agent. The encapsulation process begins with receipt of a multicast packet 151 with a payload 152 and a header 153 containing a local multicast address of the home domain in its destination field and encapsulating the packet 151 in a packet 161 destined to a global multicast address contained in an encapsulation header 162.

Figure 11:
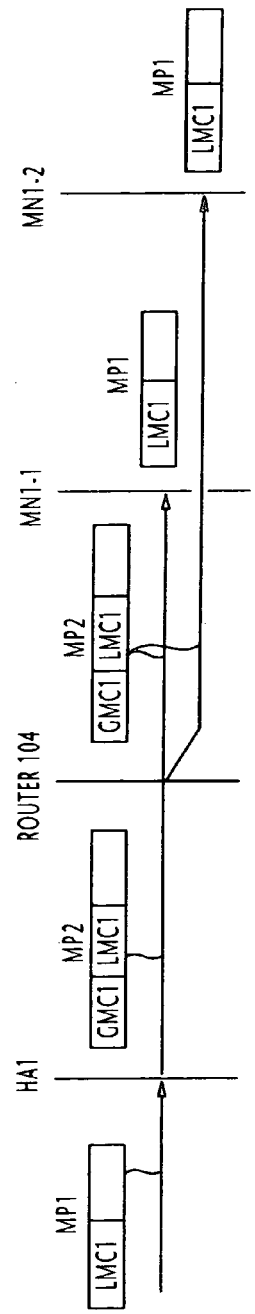
FIG. 11 is a sequence diagram illustrating a flow of a multicast packet of the format of FIG. 10 transmitted from home domain to mobile nodes visiting a foreign domain.

In FIG. 11, when the encapsulation is performed by the home agent, the home agent HA1 receives a multicast packet MP1 from a mobile node within the home domain, containing LMC1 in its destination field, the home agent retrieves a corresponding GMC1 address from the address mapping table 135 and encapsulates the multicast packet MP1 in a multicast packet MP2 destined to the GMC1 address and transmits the packet. Router 104 of foreign domain 102 copies the multicast packet MP2 and delivers each copy to the mobile nodes M1-1 and MN1-2. In response to the multicast packet MP2, the mobile nodes MN1-1 and MN1-2 determine that their address mapping table 116 has the same GMC1 as one contained in the received packet and decapsulates the packet MP2 to extract the original multicast packet MP1.

Figure 12:
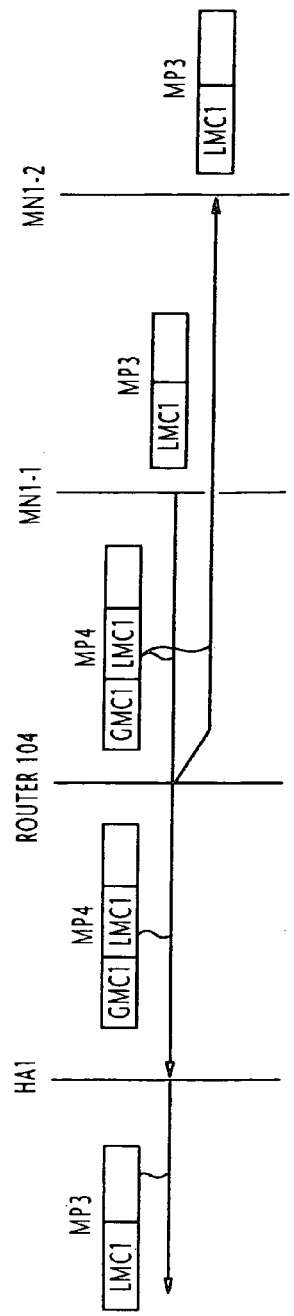
FIG. 12 is a sequence diagram illustrating a flow of a multicast packet of the format of FIG. 10 transmitted from a visiting mobile node to home domain.

In FIG. 12, when the mobile node MN1-1 performs a multicast transmission, it formulates a multicast packet MP3 with LMC1 and encapsulates it in a multicast packet MP4 with the corresponding GMC1 stored in the address mapping table 116 and transmits the multicast packet. The transmitted packet MP4 is received and copied by the router 104 and transmitted. Mobile node MN1-2 receives this packet and finds the same GMC1 in the address mapping table 116 and decapsulates the received packet to extract the original packet MP3. Home agent HA1 also receives the packet MP4 and finds the same GMC1 in its address mapping table 135 and decapsulates the packet to extract the original packet MP3.

When the home agent receives a unicast packet destined to the mobile nodes MN1-1 and MN1-2 visiting a foreign domain, the unicast packet is treated in the same manner as in the prior art, i.e., encapsulated in a packet destined to the care-of address of the mobile nodes and transmitted. In this case, the address stored in the care-of address field 115-2 of the address management table is used for formulating the packet. On receiving his packet, the mobile nodes MN1-1 and MN-12 extract the inner packet.

In this way, overhead burden associated with the prior art individual encapsulation scheme for tunnelling a packet to mobile nodes visiting a foreign domain is significantly reduced by using a global multicast address and encapsulating a multicast packet in a packet destined to the global multicast address.

Figure 13:
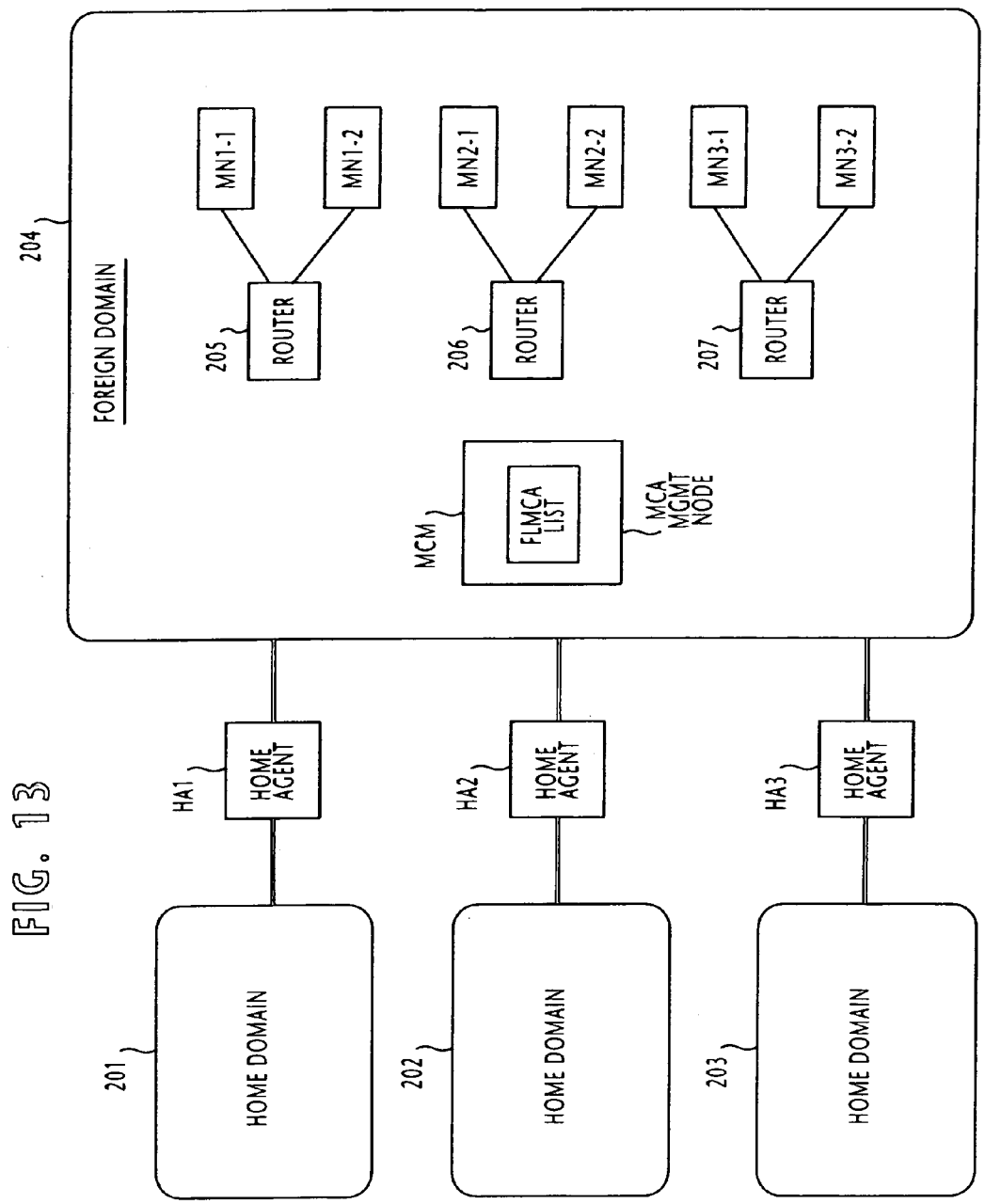
FIG. 13 is a block diagram of a mobile communication network configured according to a second embodiment of the present invention.

A mobile communication system according to a second embodiment of the present invention is shown in FIG. 13. The communication system of FIG. 13 comprises a plurality of network domains 201 through 204, of which the domain 201 is the home of mobile nodes MN1-1, MN1-2, the domain 202 is the home of mobile nodes MN2-1, MN2-2 and the domain 203 is the home of MN3-1, MN3-2. Domain 204 is a foreign domain to which all mobile nodes are currently visiting. Note that the foreign domain 204 is a neighbor of home domains 201, 202, 203 which are connected by home agents HA1, HA2, HA3, respectively, to the foreign domain 204. Home agents HA1, HA2, HA3 are located on the border between their home domains and the foreign domain 204. Routers 205, 206 and 207 are provided in the visited domain 204 for routing packets to and from mobile nodes MN1, MN2 and MN3, respectively.

A multicast management node MCM is provided in the visited domain 204. Local multicast addresses LMC1-1, LMC2-1 and LMC3-1 are locally unique multicast addresses of home domains 201, 202 and 203, respectively. All visiting mobile nodes use the respective local multicast addresses for multicast session with their home domain.

The multicast address management node MCM includes a list of local multicast addresses (LMCs). As described later, the node MCM retrieves a local multicast address from the list in response to an LMCA acquisition request message from a visiting mobile node and sends a reply message to the mobile node containing the retrieved address.

Figure 14:
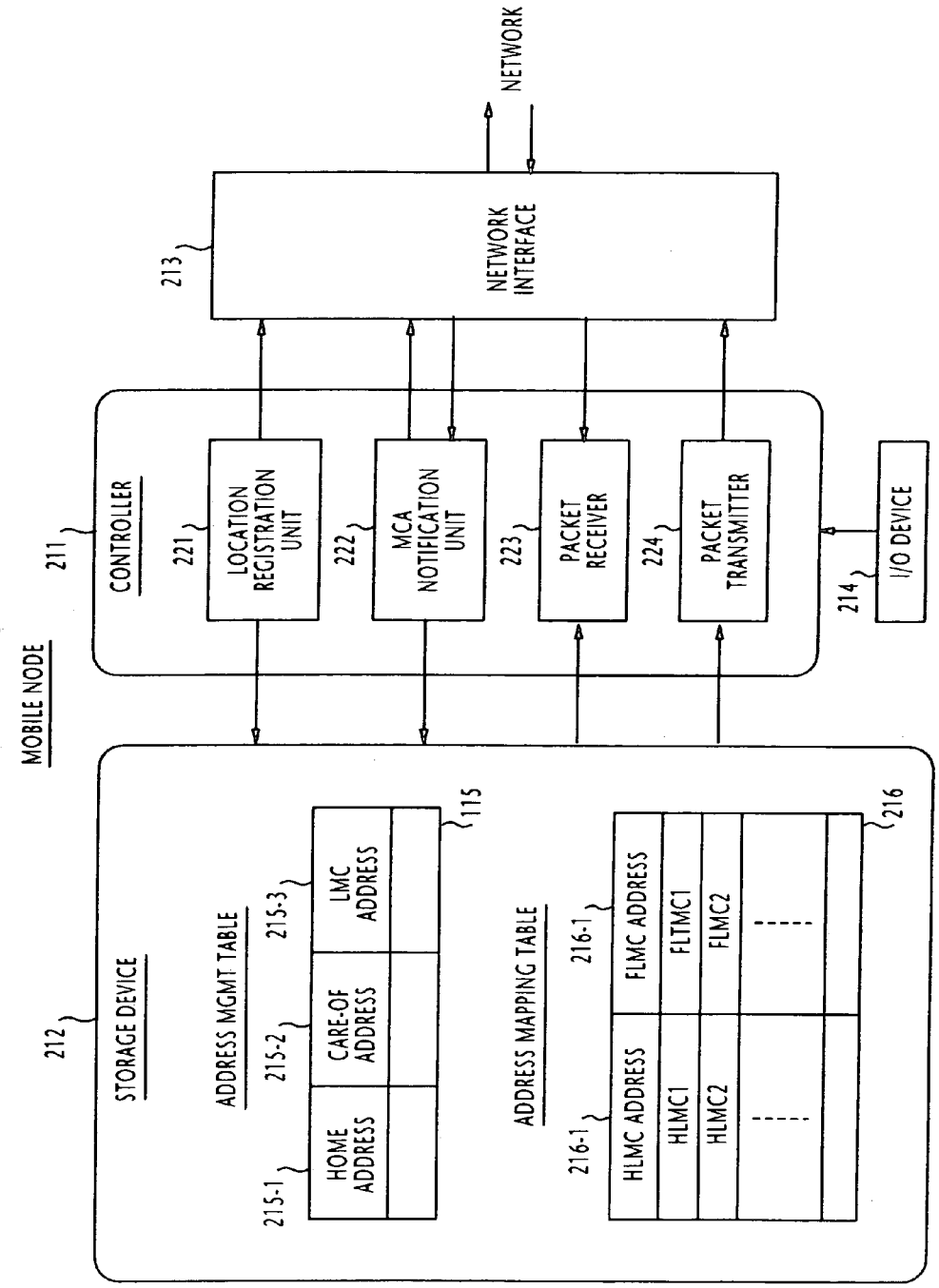
FIG. 14 is a block diagram of a mobile node of the network of FIG. 13.

As shown in FIG. 14, each of the mobile nodes is comprised of a controller 211, a storage device 212, a network interface 213, and an input/output device 214. An address management table 215 is partitioned into a plurality of fields 215-1, 215-2 and 215-3. The home address of the mobile node is set in the field 215-1 and a care-of address is set in the field 215-2. A local multicast address of the home domain 201 is set in the HLMC field 215-3 of the management table in the same manner as in the first embodiment. An address mapping table 216 includes a home local multicast address (HLMC) field 216-1 and a local multicast address (FLMC) field 216-2. The HLMC field 216-1 is used to store one or more home local multicast addresses of the home domain and the FLMC field 216-2 is used to store corresponding foreign local multicast addresses assigned by a visited foreign domain. Home local multicast addresses are mapped to corresponding foreign local multicast addresses to establish their relationships. The foreign local multicast address is an address which is locally unique to the visited foreign domain.

Controller 211 provides overall control of the mobile node and includes a location registration unit 221, a multicast address request unit 222, a packet receiver 223 and a packet transmitter 224. Communication between the controller 211 and other domains proceeds through the network interface 213 using a wireless or wired link. Location registration unit 221 operates in the same manner as the location registration unit 121 of the previous embodiment to register the current location of the mobile node with the associated home agent.

In FIG. 15, when the mobile user desires to join in a home domain multicast session, the multicast address request unit 222 reads a desired home local multicast address (HLMC) of its home domain from the LMCA field 215-3 and communicates it in a request message to the home agent (step P201). The home agent responds to this request with a reply containing a foreign local multicast address which is locally unique to the visited domain. Multicast address request unit 222 receives this reply message from the home agent (step P202) and associates the local multicast address (FLMC) of the visited domain contained in the reply message with the home local multicast address (HLMC) in the address mapping table 216 (step P203).

When a visiting mobile node receives a multicast packet using a local multicast address of the home domain, the mobile node receives it via the associated router. Packet receiver 223 examines its destination address and determines if it corresponds to a foreign local multicast address (FLMC) registered in the address mapping table 216 (step P211, FIG. 16). If it corresponds to one of the mapped foreign local multicast addresses, the packet receiver 223 decapsulates the foreign multicast packet to extract its inner packet (step P212). The extracted packet, which contains a multicast address of the home domain, is delivered to the input/output device 214 (step P213). If the decision at step P211 is negative, the received packet is processed in a conventional manner (step P214).

During the transmission mode of the multicast session, the packet transmitter 224 of the visiting mobile node determines whether the destination of a packet to be transmitted corresponds to a home local multicast address (HLMC) registered in the address mapping table 216 (step P221, FIG. 17). If the decision is affirmative, a foreign local multicast address (FLMC) associated with the home local multicast address is retrieved from the address mapping table 216 (step P222). The packet is encapsulated in a packet with the retrieved foreign local multicast address as its destination (step P223) and transmitted (step P224). If the packet to be transmitted does not correspond to any of the home local multicast addresses of the address mapping table 216, flow proceeds from step P221 to step P225 to process the received packet in a conventional manner.

Figure 18:
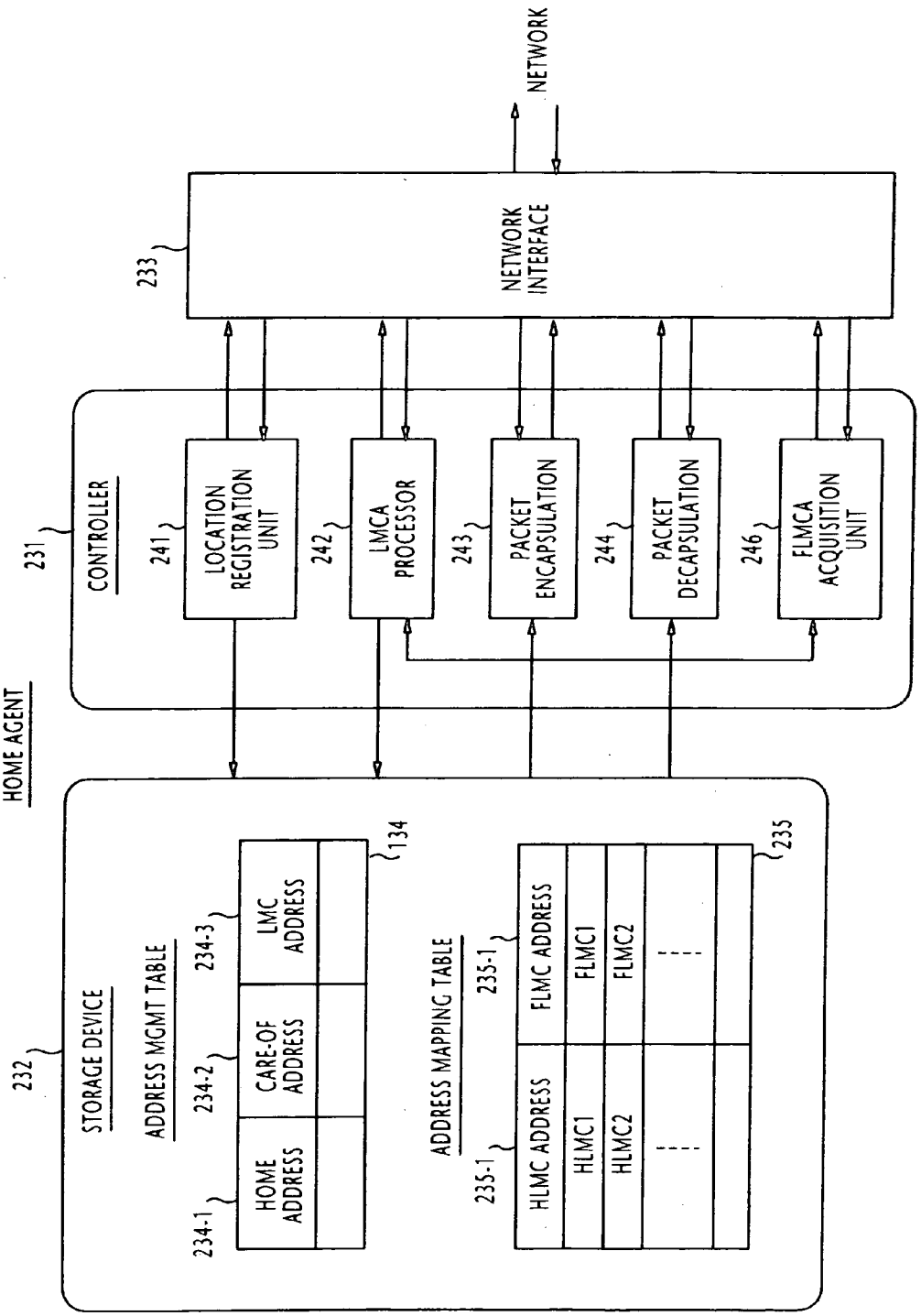
FIG. 18 is a block diagram of a home agent of the network of FIG. 13.

FIG. 18 shows details of each of the home agents of FIG. 13. Each of the home agents is comprised of a controller 231, a storage device 232, and a network interface 233. A mobile node (MN) management table 234 and an address mapping table 235 are created in the storage device 232. The MN management table 234 is partitioned into a plurality of entries which correspond respectively to different mobile nodes visiting a foreign domain. Each entry of the MN management table 234 is subdivided into fields 234-1, 234-2 and 234-3. In each MN entry, the home address of the associated mobile node is set in the field 234-1 and a care-of address of the mobile node is set in the C/O field 234-2. A home local multicast address (HLMC) of the mobile node is set in the HLMC field 234-3 of its MN entry of the table.

Address mapping table 235 includes a home local multicast address (HLMC) field 235-1 and a foreign local multicast address (FLMC) field 235-2 for mapping home local multicast (HLMC) addresses and corresponding foreign local multicast (FLMC) addresses to establish their relationships for different multicast sessions.

Controller 231 provides overall control of the home agent and includes a location registration unit 241, an LMCA processor 242, a packet encapsulation unit 243, a packet decapsulation unit 244, and a LMCA acquisition unit 246. Communication between the controller 231 and other network elements proceeds through the network interface 233 using a wireless or wired link.

When a mobile node changes its point of attachment from one domain to another, the HA location registration unit 241 receives a registration request from the mobile node, stores the home address of the mobile node in the home address field 234-1, assigns a care-of address and stores it in the care-of address field 234-2 of the MN entry of the requesting mobile node. In a subsequent multicast address registration process, the LMCA processor 242 receives an LMCA notification message from the mobile node and stores the LMC address contained in the message into the LMCA field 234-3.

Figure 19:
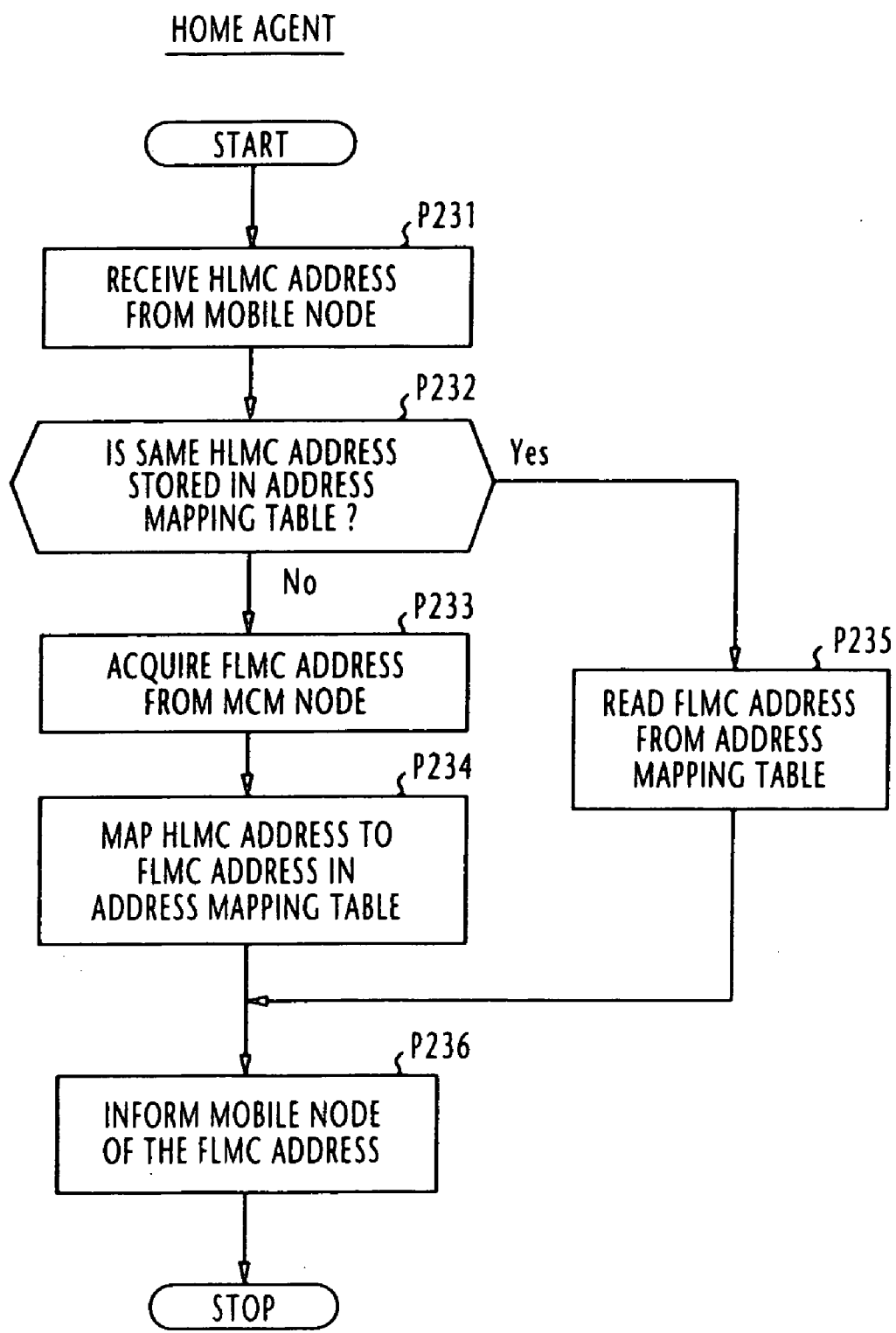
FIG. 19 is a flowchart of the operation of the home agent of FIG. 13 when it responds to the notification of a home local multicast (HLMC) address from a visiting mobile node for assigning a foreign local multicast (FLMC) address.

As shown in FIG. 19, when the home agent receives a local multicast address from a mobile node (step P231), the LMCA processor 242 searches the address mapping table 235 for a corresponding LMCA (step P232). If there is no corresponding local multicast address, the LMCA processor 242 enables the LMCA acquisition unit 246 to acquire a foreign local multicast address from the multicast address management node MCM (step P233). The acquired FLMC address is then mapped to the mobile-transmitted HLMC address in the address mapping table 235 (step P234). If the mobile-transmitted HLMC has a corresponding FLMC address in the address mapping table 235, this foreign local multicast address is retrieved from this table (step P235). The foreign local multicast address obtained by step P234 or P235 is transmitted in a reply message from the home agent to the requesting mobile node (step P236).

Therefore, if the home agent HA1 finds no foreign local multicast address corresponding to the local multicast address contained in an LMCA notification message from mobile node MN1-1, it retrieves a foreign local multicast address from the multicast address management node MCM and registers this address in the address mapping table 235 and sends a reply message containing the retrieved foreign local multicast address to the requesting mobile node. If the home agent HA1 receives a second LMCA notification message from mobile node MN1-2 for the same multicast session, it will determine that the local multicast address contained in the second notification message has a corresponding foreign local multicast address which has already been assigned to the mobile node MN1-1. Thus, the home agent retrieves the same foreign local multicast address from the address mapping table 235 and communicates this address in a reply message to the mobile node MN1-2.

Figure 20:
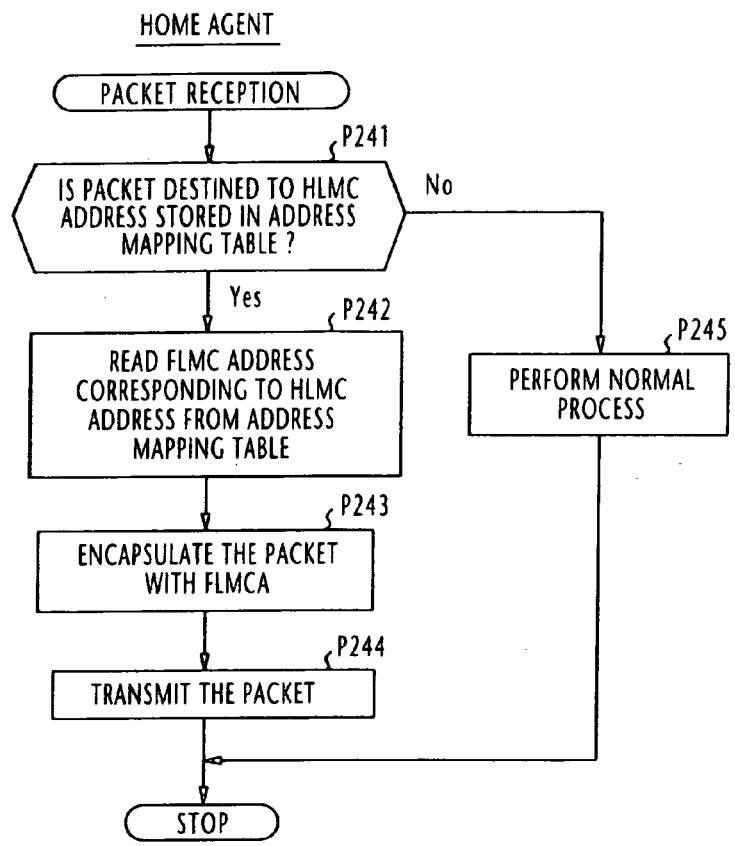
FIG. 20 is a flowchart of the encapsulation process of the home agent of FIG. 13 when receiving a multicast packet from a home domain.
Figure 21:
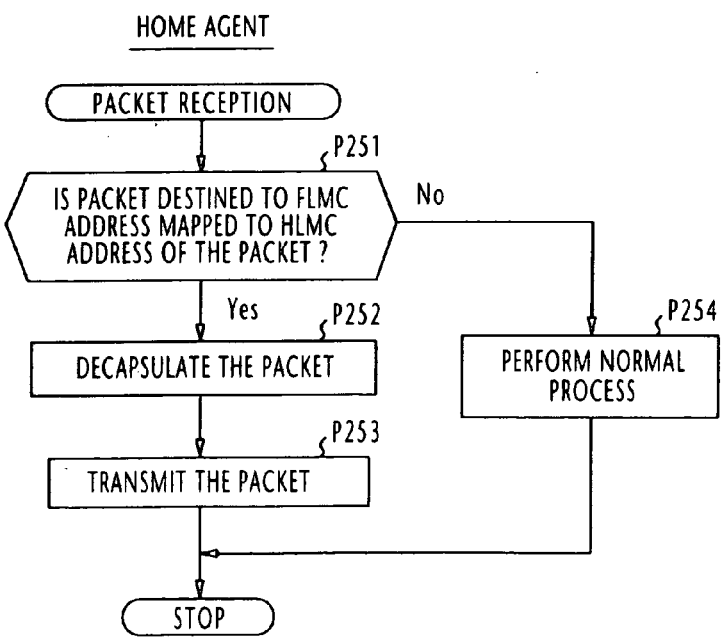
FIG. 21 is a flowchart of the decapsulation process of the home agent of FIG. 13 when receiving a multicast packet from a visiting mobile.

During a subsequent multicast session, the packet encapsulation unit 243 of the home agent controls the flow of packets from the home domain to the mobile nodes, as shown in the flowchart of FIG. 20, and the packet decapsulation unit 244 controls the flow of packets from the visiting mobile nodes to the home domain as shown in the flowchart of FIG. 21.

In FIG. 20, when the packet encapsulation unit 243 receives a multicast or unicast packet transmitted from a mobile node attached to the home domain, it reads the destination address from the packet and searches the address mapping table 235 for a corresponding local multicast address (step P241). If the decision is affirmative, a foreign local multicast address which corresponds to that local multicast address is retrieved from the address mapping table 235 (step P242). The received packet is encapsulated in a packet destined to the retrieved foreign local multicast address (step P243) and transmitted (step P244). If it is determined that the received packet has no corresponding local multicast address, a conventional process is performed on the packet (step P245).

When the packet decapsulation unit 244 of the home agent receives a multicast packet from a mobile node currently attached to the foreign domain, it checks to see if the FLMC (foreign local multicast) address of the packet coincides with an address set in the address mapping table 235 (step P251, FIG. 21). If the decision is affirmative at step P251, the received packet is decapsulated (step P252) to extract the inner packet, which is transmitted to the mobile nodes of the home domain (step P253). If the packet received at step P251 has no corresponding foreign local multicast address, a conventional process proceeds (step P254).

Therefore, if the home agent HA1 receives a multicast packet from a mobile node, containing HLMC-1 in its destination field, the corresponding FLMC-1 is retrieved from the address mapping table 235 (FIG. 18) and the received packet is encapsulated in a multicast packet destined to the FLMC-1 and transmitted. Router 205 copies this multicast packet and delivers each copy to the mobile nodes MN1 and MN2. In response to the multicast packet, the mobile nodes MN1-1 and MN1-2 determine that their address mapping table 216 (FIG. 14) has the same FLMC-1 as one contained in the received packet and decapsulates the packet to extract the original multicast packet.

When the visiting mobile node MN1-1 wishes to transmit a multicast packet to the home domain, it formulates a multicast packet with HLMC-1 and encapsulates it in a multicast packet with the corresponding FLMC-1 found in the address mapping table 216 and transmits the multicast packet. The transmitted packet is received and copied by the router 205 and transmitted. Mobile node MN1-2 receives his packet and finds the same FLMC-1 in the address mapping table 216 and decapsulates the packet to extract the original packet. Home agent HA1 also receives this packet and finds the same PLMC-1 in the address mapping table 235 and decapsulates the packet. In the same manner as described in the previous embodiment, a series of similar events occurs when the mobile node MN1-2 formulates and transmits a multicast packet, so that the packet transmitted from the mobile node MN1-2 is received and decapsulated by the mobile node MN1-1 as well as by the home agent.

When the home agent receives a unicast packet destined to the mobile nodes MN1-1 and MN1-2 visiting a foreign domain, the unicast packet is encapsulated in a packet destined to the care-of address of the mobile nodes and transmitted.

In this way, overhead burden associated with the prior art individual encapsulation scheme for tunnelling a packet to mobile nodes visiting a foreign domain is significantly reduced by using a foreign local multicast address that is unique in the visited foreign domain and encapsulating a multicast packet with the foreign local multicast address.

Figure 22:
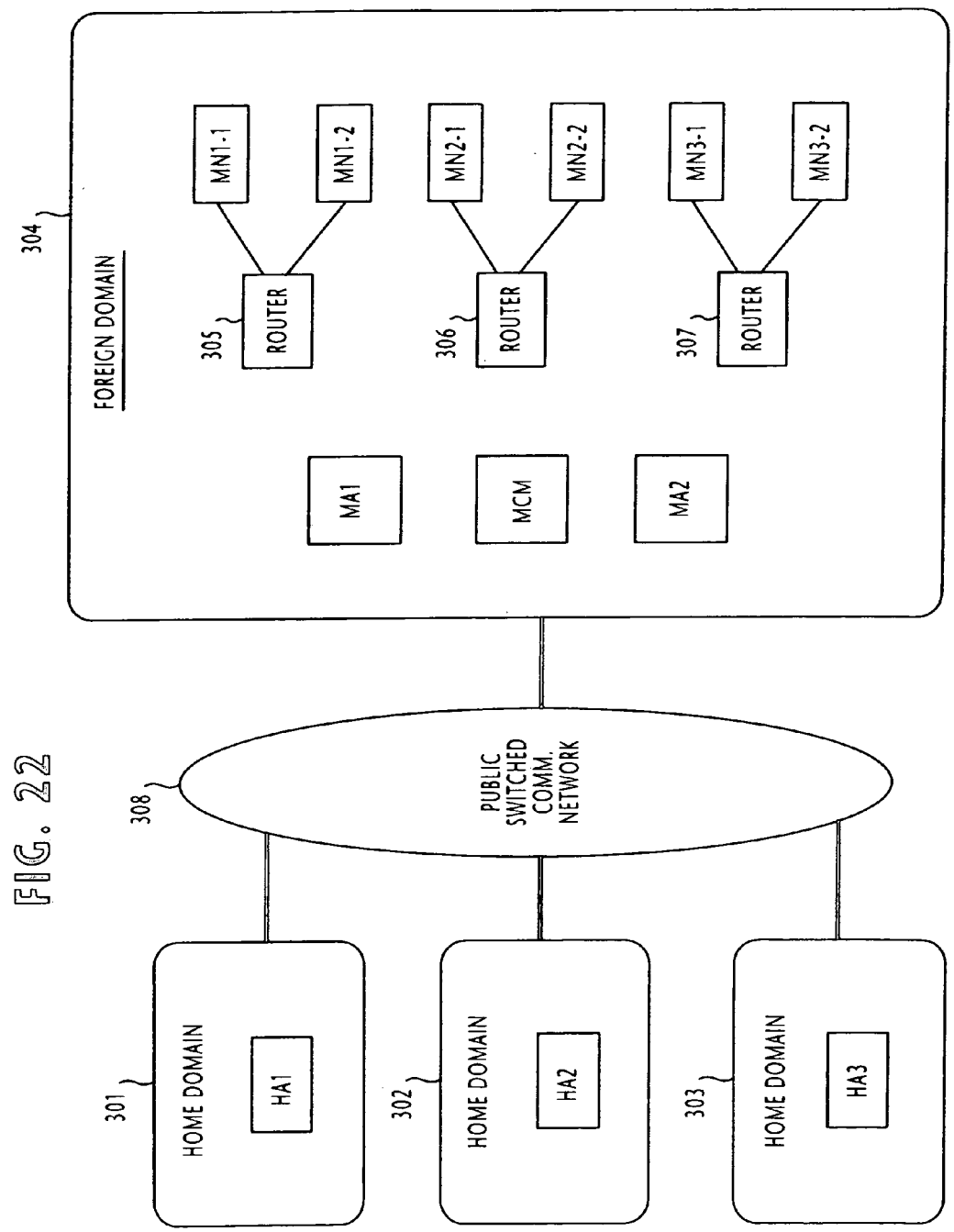
FIG. 22 is a block diagram of a mobile communication network configured according to a third embodiment of the present invention.

A mobile communication system is shown in FIG. 22 as a third embodiment of the present invention in which mobility management is hierarchically processed. This communication system is comprised of a plurality of network domains 301 to 304, of which the domains 301 to 303 are home domains of mobile nodes MN1, MN2, MN3, respectively and the domain 304 is a foreign domain to which all mobile node are currently attached through routers 305, 306, 307, respectively. The home domains 301~303 and the foreign domain 304 are interconnected via a public switched communication network 308. Home agents HA1, HA2, HA3, of mobile nodes MN1, MN2, MN3 are respectively provided in their home domains. A multicast address management (MCM) node and mobility agents MA1 and MA2 are provided in the foreign domain 304. The MCM node has a list of multicast addresses locally unique to the foreign domain 304 for assignment to multicast sessions when requested from the mobility agents MA1 and MA2.

Mobility agent MA1 is associated with mobile nodes MN1-1, MN1-2 and MN2-1, MN2-2 and mobility agent MA3 is associated with mobile nodes MN3-1, MN3-2. The visiting mobile nodes MN1, MN2, MN3 are addressed from their home domains using local multicast addresses LMC1-1, LMC2-1, LMC3-1.

The mobile nodes of this embodiment are identical in configuration to the mobile nodes of the previous embodiment (FIG. 14). The mobile nodes of this embodiment operate in the same way as in the previous embodiment in respect of packet reception and transmission (FIGS. 16 and 17). Therefore, the packet receiver 223 and packet transmitter 224 of each visiting mobile node communicate with the home domain via the associated home agent.

Mobility agents MA1, MA2 are responsible for the assignment and registration of foreign local addresses (FLMC) and perform encapsulation and decapsulation processes during a multicast session. During this multicast session, the home agents HA1~HA3 perform encapsulation on packets destined to foreign domain using the address of a mobility agent and decapsulation on packets destined to home domain.

The mobile nodes of the third embodiment operate differently from the previous embodiment in respect of the location registration and the multicast address request/registration processes.

Figure 23:
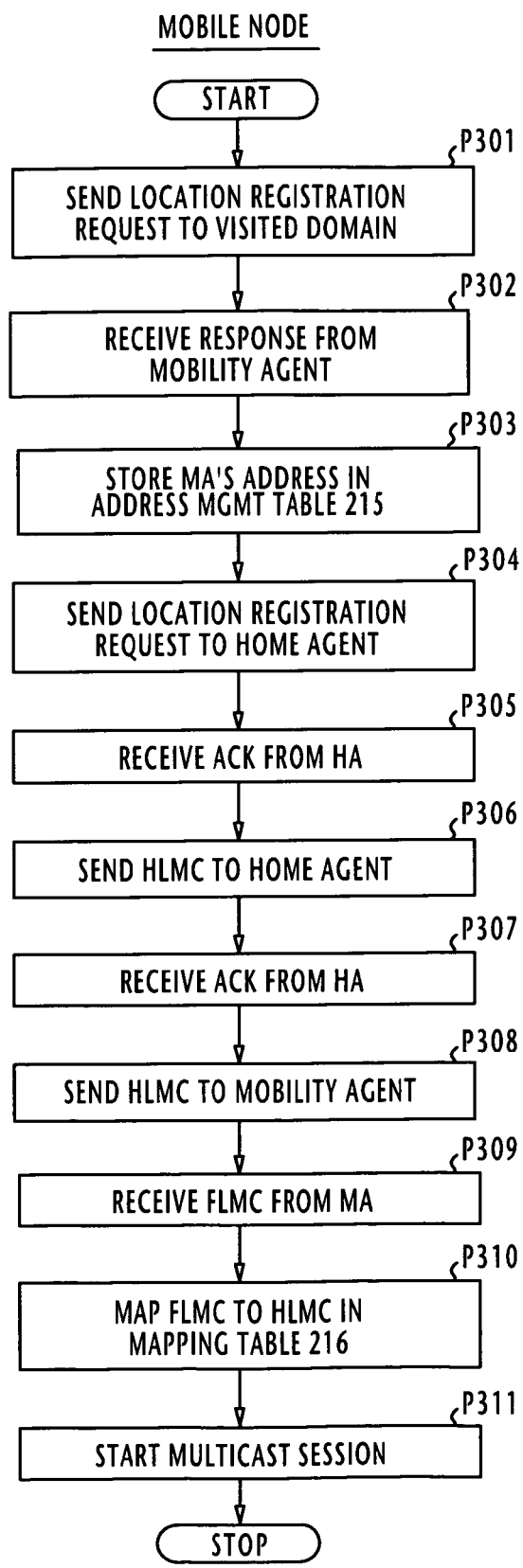
FIG. 23 is a flowchart of the operation of a mobile node of FIG. 22 which, when visiting a foreign domain, performs location registration with a home agent and a mobility agent and notification of a home local multicast (HLMC) address to the mobility agent in order to acquire a foreign local multicast (FLMC) address.

As shown in FIG. 23, when a mobile node visits the foreign domain 304, it sends a location registration request to the visited domain (step P301) and receives an acknowledgment message from a mobility agent, containing the address of the mobility agent (step P302). The address of the mobility agent is stored as a care-of address in the address field 215-1 of the address management table 215 of FIG. 14 (step P303). The visiting mobile node then transmits a location registration request to its own home agent to inform the address of the mobility agent (step P304) and receives an acknowledgment message from the home agent (step P305).

When the user of the mobile node MN1-1, for example, desires to join in a home domain multicast session, the multicast address request unit 222 (FIG. 14) reads a desired HLMC address of its home domain from the LMCA field 215-3 and sends it in a request message to the home agent HA1 (step P306). When the mobile node receives an acknowledgment message from the home agent (step P307), it sends the same HLMC address in an address request message to the mobility agent MA1 (step P308). Mobility agent MA1 responds to his address request message by requesting the multicast address management node MCM to assign a foreign local multicast address, in a manner to be described later, and replying to the requesting mobile node with a message containing the assigned foreign local multicast (FLMC) address. This FLMC address is locally unique to the visited domain 304. Multicast address request unit 222 receives this reply message from the mobility agent MA1 (step P309) and associates this FLMC address with that HLMC address in the address mapping table 216 (step P310). A multicast session will begin at step P311.

Figure 24:
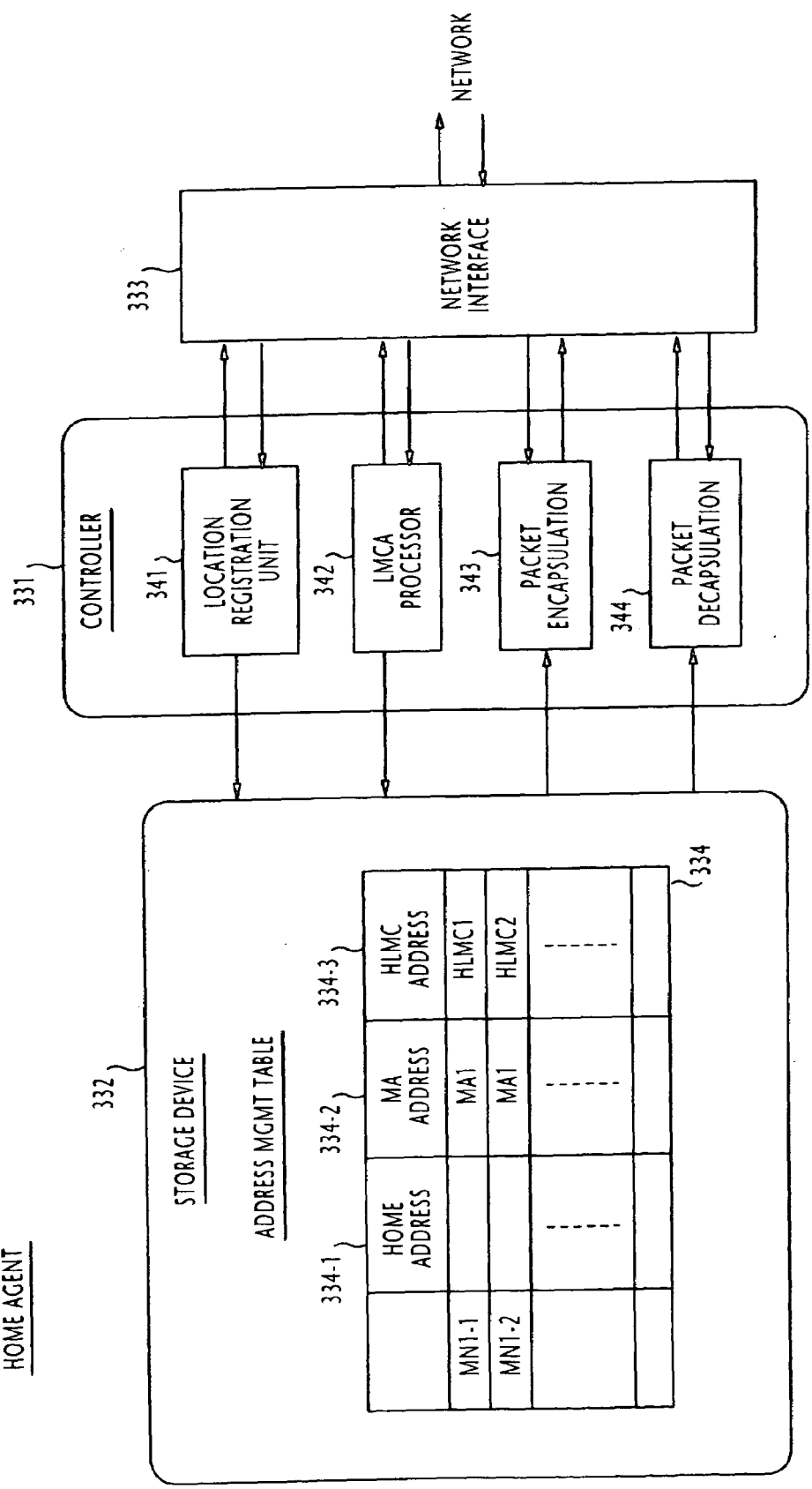
FIG. 24 is a block diagram of a home agent of the network of FIG. 22.

FIG. 24 illustrates details of each home agent of FIG. 22. Each of the home agents is comprised of a controller 331, a storage device 332, and a network interface 333. A mobile node (MN) management table 334 is created in the storage device 332. The MN management table 334 is partitioned into a plurality of entries which correspond respectively to different mobile nodes visiting a foreign domain. Each entry of the MN management table 334 is subdivided into fields 334-1, 334-2 and 334-3. In each MN entry, the home address of the associated mobile node is set in the field 334-1 and a mobility-agent address is set in the field 334-2. An HLMC address of the visiting mobile node is set in the HLMC field 334-3 of its entry.

Controller 331 provides overall control of the home agent and includes a location registration unit 341, an LMCA processor 342, a first packet processor 343, a second packet processor 344, and a LMCA acquisition unit 346. Communication between the controller 331 and other network elements proceeds through the network interface 333 using a wireless or wired link.

When a mobile node changes its point of attachment from one domain to another, the HA location registration unit 341 receives a registration request from the mobile node, stores the home address of the mobile node and the address of a mobility agent contained in the registration request message in the home address field 334-1 and the MA address field 334-2 of the entry of the requesting mobile node. Following the location registration process, the LMCA processor 342 receives an LMCA notification message from the mobile node and stores the HLMC address contained in the message into the LMCA field 334-3.

Figure 25:
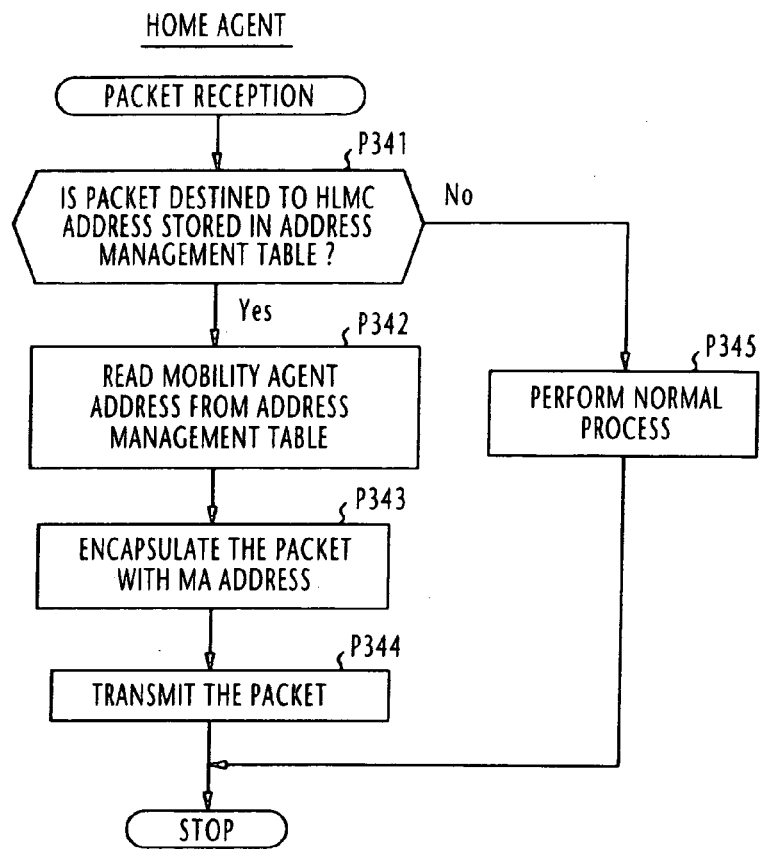
FIG. 25 is a flowchart of the encapsulation process of the home agent of FIG. 22 when receiving a multicast packet from a home domain.
Figure 26:
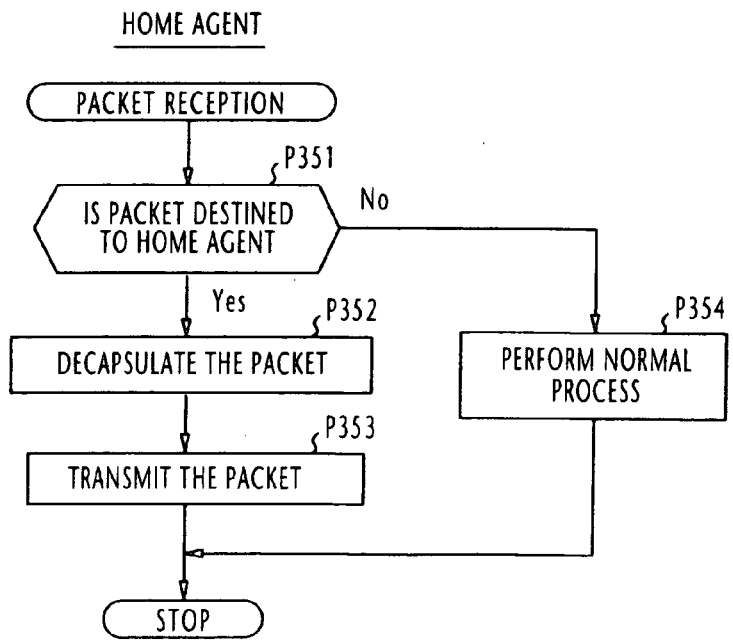
FIG. 26 is a flowchart of the decapsulation process of the home agent of FIG. 22 when receiving a multicast packet from a visiting mobile.

During a multicast session, the first packet processor 343 of the home agent controls the flow of packets from the home domain to the mobile nodes, as shown in the flowchart of FIG. 25, and the second packet processor 344 controls the flow of packets from the visiting mobile nodes to the home domain as shown in the flowchart of FIG. 26.

In FIG. 25, when the first packet processor 343 receives a multicast or unicast packet transmitted from a mobile node attached to the home domain, it checks to see if the destination address contained in the packet coincides with the LMC address of the MN management table 334 (step P341). If the decision is affirmative, the mobility agent (MA) address is read from the management table 334 (step P342). The received packet is encapsulated with the MA address read from the address management table 334 (step P343) and transmitted (step P344). If the received packet has no corresponding local multicast address, a conventional process is performed on the packet (step P345).

When the home agent receives a multicast packet from a mobile node currently attached to the foreign domain, it checks to see if the address of its own home agent HA1 is contained in the destination field of the encapsulation header of the packet (step P351, FIG. 26). If the decision is affirmative at step P351, the received packet is decapsulated (step P352) and the inner packet is transmitted to the mobile nodes of the home domain (step P353). If a received packet is not addressed to the home agent itself, a conventional process proceeds (step P354).

shows details of each of the mobility agents MA1 and MA2. Each mobility agent is comprised of a controller 351, a storage device 352, and a network interface 353. A mobile node (MN) management table 354 and an address mapping table 355 are created in the storage device 352. The MN management table 354 is partitioned into a plurality of entries which correspond respectively to different mobile nodes visiting a foreign domain. Each entry of the MN management table 354 is subdivided into fields 354-1, 354-2 and 354-3. In each MN entry, the home address of the associated mobile node is set in the field 354-1, and a home agent (HA) address is set in the field 354-2, and a home local multicast address (HLMC) of the mobile node is set in the field 354-3. Address mapping table 355 includes an HLMC field 355-1 and an FLMC address field 355-2 for mapping a plurality of HLMC addresses and corresponding FLMC addresses to establish their relationships for different multicast sessions.

Controller 351 provides overall control of the mobility agent and includes a location registration unit 361, an LMCA processor 362, a packet encapsulation unit 363, a packet decapsulation unit 364, and an LMCA acquisition unit 366. Communication between the controller 351 and other network elements proceeds through the network interface 353 using a wireless or wired link.

When a mobile node changes its point of attachment from one domain to another, the MA location registration unit 361 receives a registration request from the mobile node, stores the home address of the mobile node in the home address field 354-1, and stores an HA address contained in the registration request into the HA address field 354-2. In a subsequent multicast address registration process, the HLMC address processor 362 receives an HLMC address notification message from the visiting mobile node and stores the received HLMC address in the HLMC address field 354-3.

Figure 28:
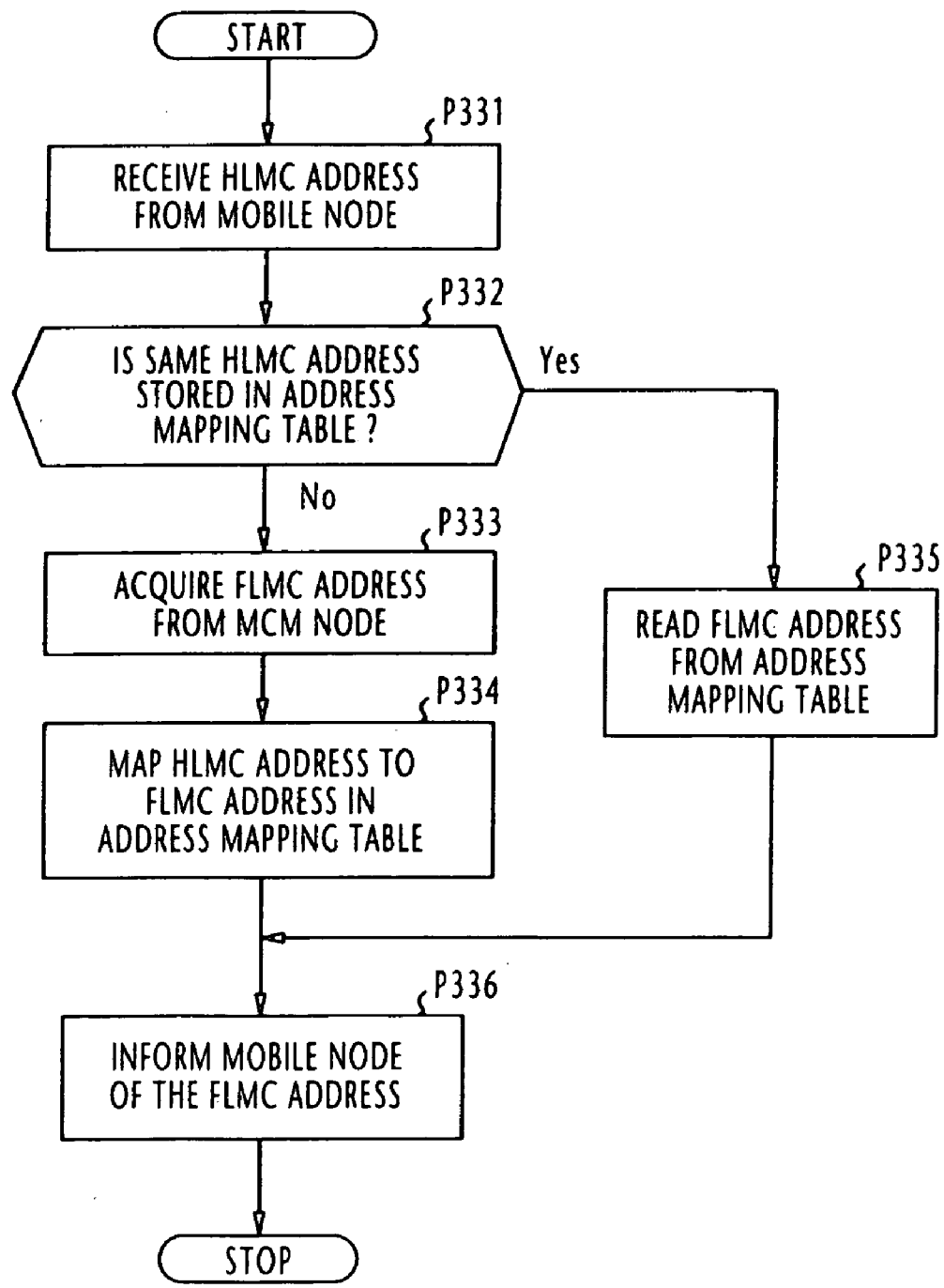
FIG. 28 is a flowchart of the operation of the mobility agent when it assigns a foreign local multicast (FLMC) address in response to a home local multicast (HLMC) address contained in a notification message from a visiting mobile node.

As shown in FIG. 28, when the mobility agent receives a local multicast (LMC) address from a mobile node visiting a foreign domain (step P331), the LMCA processor 362 of the mobility agent searches the address mapping table 355 for an LMC address corresponding to the received LMC address (step P332). If no corresponding LMC address is not detected in the address mapping table 355, the LMCA processor 362 enables the LMC address acquisition unit 366 to acquire an FLMC address from the multicast address management node MCM (step P333). More specifically, the LMC address acquisition unit 366 sends an address request to the MCM node, which responds to the message for retrieving an available address from a list of multicast (FLMC) addresses locally unique to the visited domain 304. The LMC address acquisition unit 366 receives this LFMC address and maps it to the LMC address received from the mobile node in the address mapping table 355 (step P334). The acquired FLMC address is transmitted to the mobile node (step P336). If the same LMC address as one received from the mobile node is detected in the address mapping table 355, the LMC address acquisition unit 366 reads the FLMC address from the address mapping table 355 corresponding to that LMC address (step P335) and transmits this FLMC address to the mobile node (step P336).

Figure 29:
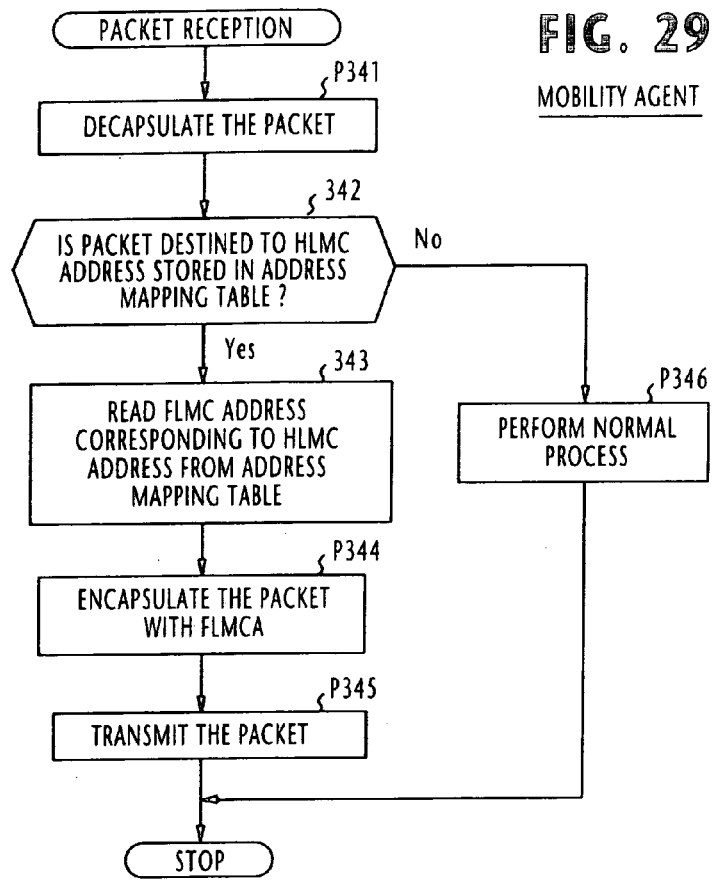
FIG. 29 is a flowchart of the operation of the mobility agent when it intercepts a multicast packet from home domain to a visiting mobile node.
Figure 30:
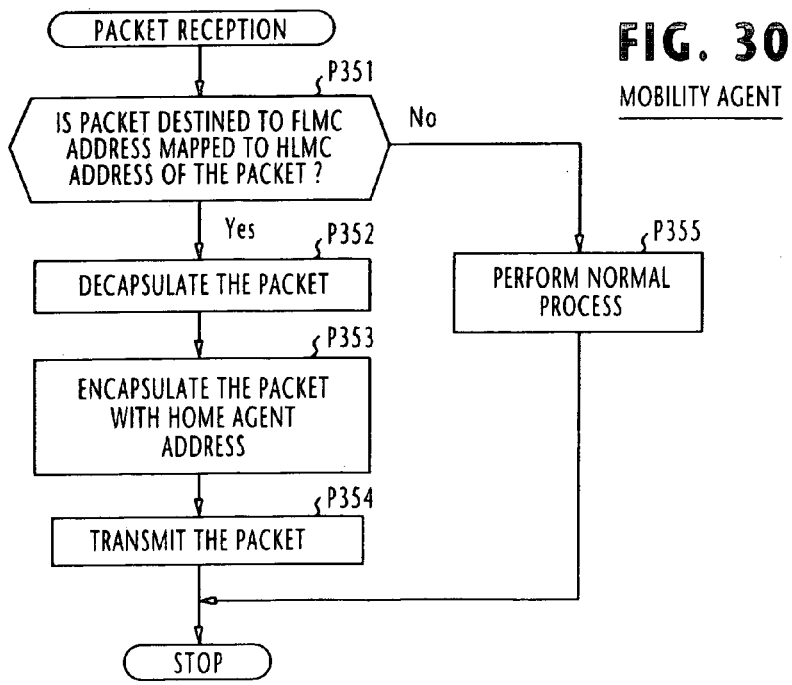
FIG. 30 is a flowchart of the operation of the mobility agent when it intercepts a multicast packet from a visiting mobile node to home domain.

During a subsequent multicast session, the packet encapsulation unit 363 of the mobility agent controls the flow of packets from the home agent to the visiting mobile nodes, as shown in the flowchart of FIG. 29, and the packet decapsulation unit 364 controls the flow of packets from the visiting mobile nodes to their home agent as shown in the flowchart of FIG. 30.

In FIG. 29, when the packet encapsulation unit 363 receives a packet destined to it from the home agent HA1, for example, it decapsulates the packet (step P341) and searches the address mapping table 355 for an HLMC address that corresponds to the destination address of the decapsulated packet (step P342). If the decision is affirmative at step P342, an FLMC address which corresponds to that HLMC address is retrieved from the address mapping table 355 (step P343). The received packet is encapsulated in a packet destined to the retrieved FLMC address (step P344) and transmitted (step P355). If the decapsulated packet contains no LMC address corresponding to the destination address of the decapsulated packet, a conventional process is performed on the packet (step P346).

When the packet encapsulation unit 364 of the mobility agent receives a multicast packet from the mobile node MN1-1, for example, which contains an FLMC address (i.e., LMC1-2) of the visited domain 304, it checks to see if the address LMC1-2 coincides with an address stored in the address mapping table 355 (step P351, Pig. 30). If LMC1-2 coincides with LMC1-1, the decision is affirmative at step P351 and the address management table 354 is searched for an MN entry (i.e., MN1-1) that contains the same address LMC1-1 and reads the address of home agent HA1 from the HA address field 354-2 of the MN1-1 entry. The extracted packet is encapsulated with the address of home agent HA1 (step P353) and transmitted (step P354). If the packet received at step P351 has no corresponding foreign local multicast address, a conventional process proceeds (step P355).

In FIG. 31, when the home agent HA1 receives a multicast packet MP11 from a mobile node within the home domain, containing the address HLMC1 in its destination field, it retrieves the mobility agent (MA1) address from the care-of address field of management table 334 and encapsulates the multicast packet MP11 in a multicast packet MP12 destined to the address MA1 for transmission. On receiving this packet, the mobility agent MA1 decapsulates the packet (step P341, FIG. 29) and retrieves the address FLMC1 corresponding to the address HLMC1 of packet MP11 from the address mapping table 316 and encapsulates the packet MP11 in a multicast packet MP13 destined to the address FLMC1 for transmission to the foreign domain. Router 305 copies the multicast packet MP13 and delivers each copy to the mobile nodes MN1-1 and MN1-2. In response to the multicast packet MP12, the mobile nodes MN1-1 and MN1-2 determine that their address mapping table 216 (FIG. 14) has the same address FLMC1 as one contained in the packet MP13 and decapsulates the packet MP13 to extract the original multicast packet MP11.

Figure 27:
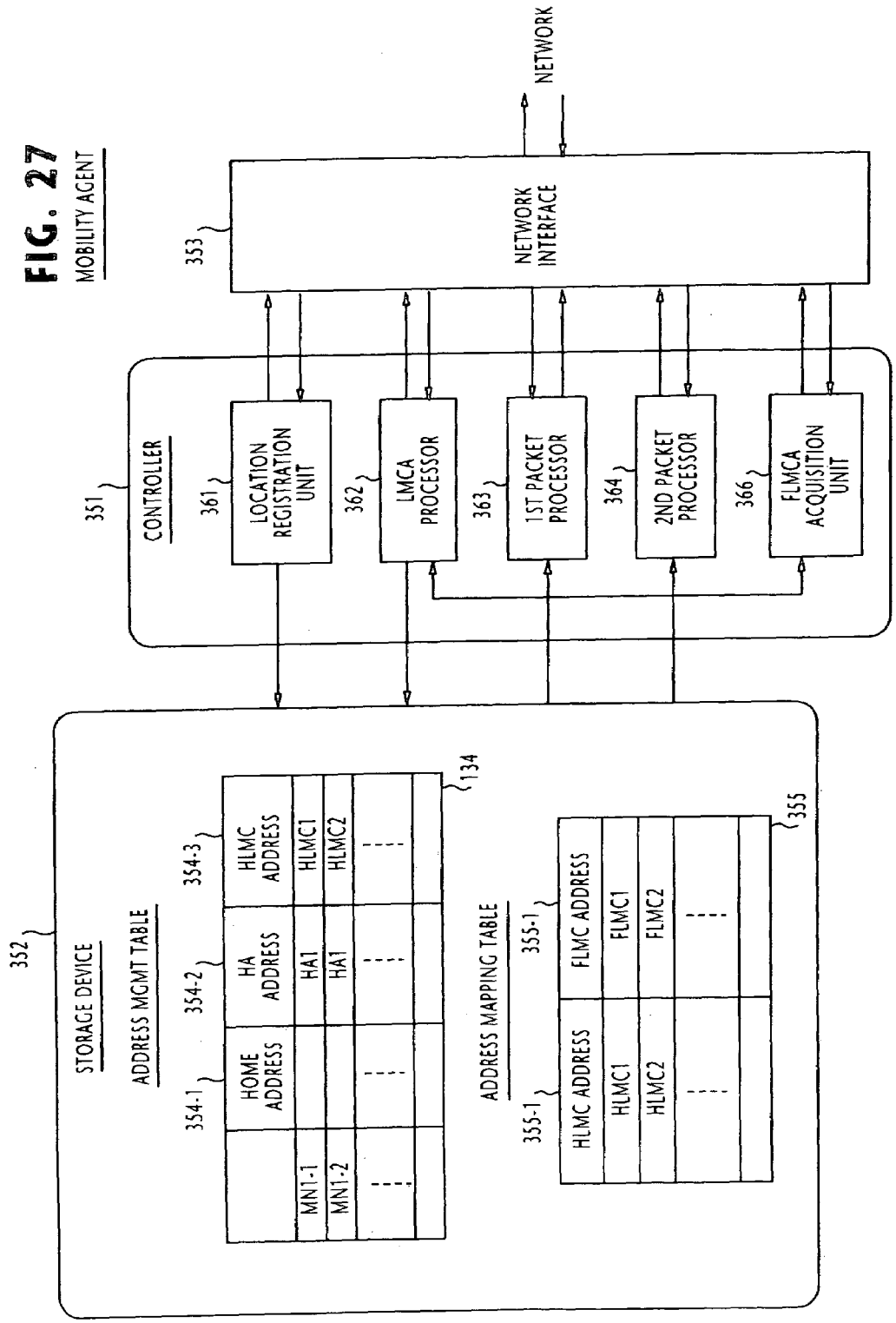
FIG. 27 is a block diagram of a mobility (management) agent of the network of FIG. 22.

In FIG. 32, when the mobile node MN1-1 performs a multicast transmissions it formulates a multicast packet MP14 with HLMC1 and encapsulates it in a multicast packet MP15 with the corresponding address FLMC1 stored in the address mapping table 216 (FIG. 14) and transmits the multicast packet MP15. The transmitted packet MP15 is copied by the router 305 and transmitted. When the mobile node MN1-2 receives a copy of packet MP15, it finds the same FLMC1 in the address mapping table 216 and decapsulates the received packet to extract the original packet MP14. When the mobility agent MA1 receives the packet M15 (FIG. 30), it finds the same address FLMC1 in the address mapping table 355 (FIG. 27) and decapsulates the packet MP15 and reads the home agent address HA1 in the address management table 354 and encapsulates the original packet MP14 in a packet MP16 destined to the address HA1 (step P353) and transmits the packet MP16. Since the packet MP16 is addressed to the home agent HA1, the packet is decapsulated by the home agent HA1 and the inner packet MP14 is transmitted from the home agent HA1 to the home domain (FIG. 26).

In this way, the overhead burden associated with the prior art multicast session using a hierarchical mobility management scheme is significantly reduced by encapsulating a home-transmitted multicast packet in a packet destined to a mobility agent and transmitting it to a foreign domain. In the foreign domain, the transport packet is decapsulated to extract the home-transmitted multicast packet. The extracted packet is again encapsulated in a packet destined to a multicast address that is locally unique to the foreign domain. In the prior art scheme, the extracted multicast packet is encapsulated in a packet destined to each mobile node visiting the foreign domain.

What is claimed is:

1. A method of establishing a multicast session in a communication network between a home domain of the network and a mobile node visiting a foreign domain of the network, said home domain including a home agent and said foreign domain including a router, comprising the steps of:
   a) creating, in said home agent, a first table that maps a plurality of first multicast addresses to a plurality of corresponding second multicast addresses and creating, in said visiting mobile node, a second table identical to said first table, said first multicast addresses being locally unique in the home domain and said second multicast addresses being either globally unique in the communications network or locally unique in said foreign domain;
   b) at said home agent, receiving from the network a packet of a first multicast address mapped in said first table, encapsulating the packet with the corresponding second multicast address, and transmitting the encapsulated packet to the network;
   c) at said router, duplicating a packet from the network that contains one of said second multicast addresses and transmitting the duplicated packet to the network; and
   d) at said visiting mobile node, processing a packet from the network that contains a second multicast address and a first multicast address that are mapped to each other in said second table.

2. The method of claim 1, further comprising the steps of:
   at said visiting mobile node, encapsulating a packet of a first multicast address mapped in said second table with the corresponding second multicast address, and transmitting the encapsulated packet to the network,
   at said router, duplicating a packet from the network that contains one of said second multicast addresses, and transmitting the duplicated packet to the network, and
   at said home agent, processing a packet from the network that contains a second multicast address and a first multicast address that are mapped in said first table, decapsulating the packet, and transmitting the decapsulated packet to the network.

3. A method of establishing a multicast session in a communication network between a home domain of the network and a mobile node visiting a foreign domain of the network, said home domain including a home agent and said foreign domain including a mobility agent and a router comprising the steps of:
   creating, in said home agent, a first table that maps a plurality of home multicast addresses to a mobility-agent address identifying said mobility agent and creating, in said mobility agent, a second table that maps said home multicast addresses to a plurality of corresponding foreign multicast addresses, and a third table, in said visiting mobile node, identical to said second table, said home multicast addresses being locally unique in the home domain and said foreign multicast addresses being locally unique in the foreign domain;
   at said home agent, receiving a packet that contains a home multicast address mapped in said first table, encapsulating the packet with the corresponding mobility-agent address, and transmitting the encapsulated packet to the network;
   at said mobility agent, receiving a packet that contains said mobility-agent address, replacing the mobility-agent address with a foreign multicast address that corresponds in said second table to the home multicast address of the packet and transmitting the packet to the network;
   at said router, duplicating a packet from the network that contains one of said foreign multicast addresses, and transmitting the duplicated packet to the network, and
   at said visiting mobile node, processing a packet from the network that contains a home multicast address and a foreign multicast address that are mapped to each other in said third table.

4. The method of claim 3, further comprising the steps of:
   at said visiting mobile node, encapsulating a packet of a home multicast address mapped in said third table with the corresponding foreign multicast address, and transmitting the encapsulated packet to the network;
   at said router, duplicating a packet from the network that contains one of said foreign multicast addresses, and transmitting the duplicated packet to the network;
   at said mobility agent, receiving from the network a packet of a foreign multicast address mapped in said second table, replacing the foreign multicast address with a home-agent address identifying said home agent, and transmitting the packet to the network; and
   at said home agent, receiving from the network a packet of the home-agent address and decapsulating the packet to remove the home-agent address, and transmitting the decapsulated packet to the network.

5. The method of claim 3, wherein said foreign domain further includes a multicast address management node that maintains a plurality of said foreign multicast addresses, further comprising the step of acquiring, at said home agent, said foreign multicast addresses from said multicast address management node, and notifies said mobile node of the obtained foreign local multicast address in response to a request message therefrom.

6. A mobile communication system having a home domain and a foreign domain interconnected by a communications network, comprising:
   a home agent, located in said home domain, including a first table that maps a plurality of first multicast addresses to a plurality of corresponding second multicast addresses, receiving a packet of a first multicast address mapped in said first table, encapsulating the packet with the corresponding second multicast address, and transmitting the encapsulated packet to the network, said first multicast addresses being locally unique in the home domain and said second multicast addresses being either globally unique in the communications network or locally unique in said foreign domain;

a router, located in said foreign domain, for duplicating a packet that contains one of said second multicast addresses and transmitting the duplicated packet to the network; and a mobile node visiting said foreign domain including a second table identical to said first table, processing a packet from the network that contains a second multicast address and a first multicast address that are mapped to each other in said second table.

7. The mobile communication system of claim 6, wherein said visiting mobile node encapsulates a packet with a first multicast address mapped in said second table with the corresponding second multicast address, and transmits the encapsulated packet to the network, said router duplicates the packet from said mobile node, and transmits the duplicated packet to the network, and said home agent receives the duplicated packet from said router if the packet contains a second multicast address and a first multicast address that are mapped to each other in said first table, decapsulates the received packet, and transmits the decapsulated packet to the network.

8. The mobile communication system of claim 7, wherein said visiting mobile node sends a request message to said home agent, and wherein said home agent includes a list of said second multicast addresses and notifies said mobile node of one of the second multicast addresses of said list in response to said request message.

9. A mobile communication system having a home domain and a foreign domain interconnected by a communications network, comprising:

a home agent in said home domain including a first table that maps a plurality of home multicast addresses locally unique in the home domain to a mobility-agent address identifying said mobility agent, said home agent receiving a packet that contains a home multicast address mapped in said first table, encapsulating the packet with the corresponding mobility-agent address, and transmitting the encapsulated packet to the network;

a mobility agent in said foreign domain including a second table that maps said home multicast addresses to a plurality of corresponding foreign multicast addresses locally unique in the foreign domain, said mobility agent receiving a packet that contains said mobility-agent address, replacing the mobility-agent address with a foreign multicast address that corresponds in said second table to the home multicast address of the packet, and transmitting the packet to the network;

a router in said foreign domain for duplicating a packet from the network that contains one of said foreign multicast addresses, and transmitting the duplicated packet to the network; and a visiting mobile node in said foreign domain including a third table identical to said second table, said visiting mobile node processing a packet from the network that contains a home multicast address and a foreign multicast address that are mapped to each other in said third table.

10. The mobile communication system of claim 9, wherein said visiting mobile node encapsulates a packet of a home multicast address mapped in said third table with the corresponding foreign multicast address, and transmitting the encapsulated packet to the network;

wherein said router duplicates a packet from the network that contains one of said foreign multicast addresses, and transmits the duplicated packet to the network;

wherein said mobility agent receives from the network a packet of a foreign multicast address mapped in said second table, replaces the foreign multicast address with a home-agent address identifying said home agent, and transmits the packet to the network; and wherein said home agent receiving from the network a packet of the home-agent address and decapsulates the packet to remove the home-agent address, and transmits the decapsulated packet to the network.

11. The mobile communication system of claim 9, wherein said foreign domain further includes a multicast address management node that maintains a plurality of said foreign multicast addresses, and said home agent acquires said foreign multicast addresses from said multicast address management node, and notifies said visiting mobile node of the acquired foreign local multicast address in response to a request message therefrom.

12. The mobile communication system of claim 11, wherein said visiting mobile node sends a request message to said mobility agent, and wherein said mobility agent obtains said foreign local multicast addresses from said multicast address management node and notifies said visiting mobile node of the obtained foreign local multicast addresses in response to said request message.

* * * * *